(12) United States Patent
More et al.

(10) Patent No.: US 9,077,204 B2
(45) Date of Patent: Jul. 7, 2015

(54) DISPATCHABLE RENEWABLE ENERGY GENERATION, CONTROL AND STORAGE FACILITY

(75) Inventors: Eduardo J. More, Palm Beach Gardens, FL (US); Gregory F. Ellena, Palm Beach Gardens, FL (US); Daniel Brake, Hobe Sound, FL (US); James A. Keener, Wellington, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 528 days.

(21) Appl. No.: 13/554,574

(22) Filed: Jul. 20, 2012

(65) Prior Publication Data
US 2013/0184884 A1 Jul. 18, 2013

Related U.S. Application Data

(60) Provisional application No. 61/509,872, filed on Jul. 20, 2011.

(51) Int. Cl.
| | |
|---|---|
| *F03D 7/00* | (2006.01) |
| *F03D 7/02* | (2006.01) |
| *F03D 9/02* | (2006.01) |
| *H02J 3/14* | (2006.01) |
| *H02J 3/32* | (2006.01) |

(52) U.S. Cl.
CPC ............ *H02J 3/14* (2013.01); *F03D 7/0284* (2013.01); *F03D 9/021* (2013.01); *H02J 3/32* (2013.01); *F03D 7/00* (2013.01); *Y02E 70/30* (2013.01); *Y02E 10/723* (2013.01); *Y02E 10/766* (2013.01)

(58) Field of Classification Search
CPC ........... F03D 7/00; F03D 7/028; F03D 9/021; H02J 3/14; H02J 3/32
USPC .......................................... 700/286, 291, 297
See application file for complete search history.

(56) References Cited

U.S. PATENT DOCUMENTS

| | | | |
|---|---|---|---|
| 7,042,110 B2 | 5/2006 | Mikhail et al. | |
| 2008/0167756 A1* | 7/2008 | Golden et al. ................. | 700/297 |
| 2012/0197452 A1* | 8/2012 | Matthews et al. ............. | 700/292 |
| 2012/0323396 A1* | 12/2012 | Shelton et al. ................ | 700/297 |

OTHER PUBLICATIONS

Bhuiyan, F.A.; Yazdani, A., "Multimode Control of a DFIG-Based Wind-Power Unit for Remote Applications," Power Delivery, IEEE Transactions on , vol. 24, No. 4, pp. 2079,2089, Oct. 2009.*

* cited by examiner

*Primary Examiner* — Robert Fennema
*Assistant Examiner* — Jennifer L Norton
(74) *Attorney, Agent, or Firm* — Feldman Gale. P.A.; Rafael Perez-Pineiro; A. Robert Weaver

(57) ABSTRACT

The present invention includes a system and method for generating, controlling and storing dispatchable renewable energy. The system may include one or more wind power generation facilities and one or more solar power generation facilities to generate power that can be stored by one or more storage facilities. The power can be supplied to a power grid at a level determined by actual or predicted weather conditions, based on variable power demands. The power generated by the renewable energy sources may be combined with power generated by conventional power generation facilities to provide power in a dispatchable manner.

13 Claims, 25 Drawing Sheets

| Source | System Inputs |
|---|---|
| 3rd Party System | Grid Demand at POI (MW's) |
| 3rd Party System | Generation Price ($/MWh) |
| Interconnect Agreement | Power Factor Limits at POI |
| | |
| Meter | Grid Output at POI (MW's) |
| Meter | Grid Frequency at POI (Hz) |
| Meter | Grid Voltage at POI (kV) |
| Meter | Combine Active Power (MW's) |
| Meter | Combine Reactive Power (MVAR's) |
| Meter | Solar Active Power (MW's) |
| Meter | Solar Reactive Power (MVAR's) |
| Meter | Wind Active Power (MW's) |
| Meter | Wind Reactive Power (MVAR's) |
| Meter | Storage Active Power (MW's) |
| Meter | Storage Reactive Power (MVAR's) |
| Meter | Storage Level (%) |
| Meter | Other Non-Renew Gen (MW's) |
| | |
| 3rd Party System | Generation Demand Forecast 5min |
| 3rd Party System | Generation Demand Forecast 1hr |
| 3rd Party System | Generation Demand Forecast 1day |
| 3rd Party System | Generation Price Forecast 1hr |
| 3rd Party System | Generation Price Forecast 1day |

| System Variables (x) | Y=f(x) |
|---|---|
| Generation Demand (MW's) | Site Current Operational Parameters: |
| Generation Price ($/MWh) | Combine Gen To Grid (MW's) |
| Power Factor Limits | Solar Generation To Grid (MW's) |
|  | Wind Generation To Grid (MW's) |
| Grid Output (MW's) | Storage Generation To Grid (MW's) |
| Grid Frequency (hz) | Other Non Renew Gen To Grid (MW's) |
| Grid Voltage (kV) | Total Generation To Grid (MW's) |
| Combine Active Pwr Actual (MW's) |  |
| Combine Reactive Pwr Actual (MVAR's) | Solar Generation To Storage (MW's) |
| Solar Active Pwr Actual (MW's) | Wind Generation To Storage (MW's) |
| Solar Reactive Pwr Actual (MVAR's) | Total Generation TO Storage (MW's) |
| Wind Active Pwr Actual (MW's) |  |
| Wind Reactive Pwr Actual (MVAR's) | Solar Gen Curtailed (MW's) |
| Storage Active Pwr Actual (MW's) | Wind Gen Curtailed (MW's) |
| Storage Reactive Pwr Actual (MVAR's) | Total Generation Curtailed (MW's) |
| Storage Level Actual (%) |  |
| Other Non-Renew Gen (MW's) | System Mode # |
| Total Power Generated (MW's) | System Mode Description |
|  |  |
| Generation Demand Forecasted (MW's) | Solar Voltage Setpoint (kV) |
| Generation Demand Forecast 5min (MW's) | Wind Voltage Setpoint (kV) |
| Generation Demand Forecast 1hr (MW's) | Storage Voltage Setpoint (kV) |
| Generation Price Forecasted ($/MWh) |  |
| Generation Price Forecast 1hr ($/MWh) |  |
| Generation Price Forecast 4hr ($/MWh) |  |

Cont'd from Fig.10-1  Cont'd on Fig.10-5  Cont'd on Fig.10-3

FIG.10-2

| System Outputs | Slave Device |
|---|---|
| Combine Current Operational Parameters: | |
| Combine Solar Setpoint (MW's) | Combine Master Controller |
| Combine Wind Setpoint (MW's) | Combine Master Controller |
| Combine Storage (MW's) | Combine Master Controller |
| Total Combine Generation (MW's) | |
| | |
| Combine Solar Storage Setpoint (MW's) | Combine Master Controller |
| Combine Wind Storage Setpoint (MW's) | Combine Master Controller |
| Total Combine Storage (MW's) | |
| Solar Generation Setpoint (MW's) | Solar Master Controller |
| Wind Generation Setpoint (MW's) | Wind Farm Master Controller |
| Storage Generation Setpoint (MW's) | Storage Master Controller |
| Non Renewable Gen Setpoint (MW's) | Non Renewable Generation Master Controller |
| Solar Voltage Setpoint (kV) | Solar Master Controller |
| Wind Voltage Setpoint (kV) | Wind Farm Master Controller |
| Storage Voltage Setpoint (kV) | Storage Master Controller |

Cont'd from Fig.10-2

FIG. 10-3

Cont'd from
Fig.10-1

| | |
|---|---|
| Constant Parameter | Max Combine Capability (MW's) |
| Historical Calculation | Combine Availability (%) |
| | |
| Constant Parameter | Max Solar Capacity (MW's) |
| 3rd Party System | Solar Forecast (Irradiance) |
| 3rd Party System | Local Weather Forcast (Overcast %) |
| Historical Calculation | Solar Availability (%) |
| Historical Calculation | Solar Inverter RUL (Cycles Cost) |
| | |
| Constant Parameter | Max Wind Capability (MW's) |
| 3rd Party System | Wind Forecast Speed (m/s) |
| 3rd Party System | Wind Forecast Direct (Deg off North) |
| 3rd Party System | Local Weather Forecast Temp Deg C |
| Constant Parameter | Wind Site Layout to Prevailing Wind |
| 3rd Party System | Wind Limitation Icing Probability |
| Constant Parameter | Wind Limitation Power Curve |
| Constant Parameter | Wind Limitation High Temp (Deg C) |
| Constant Parameter | Wind Limitation Low Temp (Deg C) |
| Historical Calculation | Wind Availability (%) |
| Historical Calculation | Wind Farm RUL ($/Start) |
| | |
| Constant Parameter | Max Storage Capability (MW) |
| Constant Parameter | Charging & Discharging Rate (Ah) |
| Historical Calculation | Storage Availability (%) |
| Historical Calculation | Storage RUL ($/Battery Cycles) |
| | |
| Constant Parameter | Max Non-Renew Capability (MW) |

Cont'd from
Fig.10-2

Combine Calc Capability (MW's)
Combine Forecast Capacity 1hr (MW's)

Solar Generation Forecasted (MW)
Solar Generation Capability 1hr (MW)
Solar Generation Forecast 1hr (MW)
Solar Generation $/MWh Wind Generation Forecasted (MW)
Wind Generation Capability 1hr (MW)
WInd Generation Forecast 1hr (MW)
Wind Generation $/MWh Cont'd from Fig.10-2

Site Forecast in One Hour:
Combine Gen To Grid (MW's)
Solar Generation To Grid (MW's)
Wind Generation To Grid (MW's)
Storage Generation To Grid (MW's)
Other Generation To Grid (MW's)
Total Generation To Grid (MW's)

Solar Generation To Storage (MW's)
Wind Generation To Storage (MW's)
Total Generation To Storage (MW's)

Solar Gen Curtailed (MW's)
Wind Gen Curtailed (MW's)
Total Generation Curtailed (MW's)

System Mode #
System Mode Description

Storage Generation Forecasted (MW)
Storage Generation Capacity 1hr (MW)
Storage Generation Forecasted 1hr (MW)
Storage Generation (MWh)
Storage Generation $/MWh Max Non-Renew Capability (MW)

DISPATCHABLE RENEWABLE ENERGY GENERATION, CONTROL AND STORAGE FACILITY

CROSS REFERENCE TO RELATED APPLICATIONS

This application claims the benefit of U.S. Provisional Application No. 61/509,872 filed Jul. 20, 2011, the disclosure of which is hereby incorporated herein by reference in its entirety.

BACKGROUND OF THE INVENTION

The present invention generally relates to power generating systems. More particularly, the present invention relates to a system for energy storage, generation and control.

As the burning of fossil fuels for energy degrades the environment even as its costs rise, and as nuclear power continues to raise substantial questions of safety, the use of sunlight and wind energy to provide electric power for the world takes on ever-increasing significance. These so-called "green" technologies have passed through the stage of innocence, and are taking on ever-larger roles in satisfying man kind's appetite for new sources of electrical power. While the promise of ecologically friendly electrical power is bright, the nature of such power, and the technologies for producing it, are largely dependent upon nature and the vagaries of wind and weather, with the result that nearly all such power generation methods must be supported by a substantial ability to provide power, regardless of local conditions of nature. In most cases, fossil fuels continue to provide power in the sufficiently large and reliable quantities required for normal business and social activities.

Wind farms currently produce approximately 2% of the earth's electrical power, with European countries leading in the proportion of electricity being produced from wind turbines. In order for wind power to be a stable source, however, generation strategies must be employed to provide sustainable output sufficient to meet instantaneous demand—and to vary such output as demand rises and falls. Fortunately, over time, instantaneous demand may be anticipated with a high degree of accuracy, barring unforeseen circumstances and anomalies that may affect the delivery of electricity to locations remote from the site of its generation. However, the other side of the equation requires the stable generation and delivery of electricity in quantities sufficient to meet, but not substantially exceed, the instantaneous demand. Further complicating the situation is the transmission grid over which electricity must be delivered, and the marketplace nature of electrical generation in which the price a distribution utility will pay for electricity from a generating facility may vary from moment to moment. For the most part, electricity is bought and sold through short term contracts that may have a life from as little as a few hours to as much as a few months, with the largest number being of 30 days duration or so. As a result of the fluctuating price of electricity, a power generation facility may be required to curtail the amount of power it delivers to a transmission or distribution utility, with the consequence of having to pay money to the facility in the event that too much electricity is delivered. Thus, from the standpoint of power generation, there is a strong incentive to generate and sell electricity using the most efficient means, while curtailing production when more is being generated than has been sold. In that case, if excess electricity is being generated efficiently through solar or wind facilities, it may be desirable to store it until demand is greater or prices rise, at which point electricity may be sold from storage, either to meet peak demands or because it was generated at a time when the cost of generating was lower. Thus, an electricity generating company will seek to produce electricity when its cost for doing so is lowest, and will sell electricity when the cost is highest, all the while meeting its contractual obligations to provide an agreed upon amount at agreed upon times without providing more than called for by the transmission and distribution utility.

The continued and expanding use of fossil fuels cannot be sustained into the indefinite future. Indeed, as fossil fuels begin to price themselves out of the energy market, and as the availability and efficiency of renewable energy increases, greater emphasis will be placed upon the secure and reliable generation of electrical power from environmentally friendly sources. What is needed, then, is a system and method for reliably providing wind and solar energy on a scale that is suitable for commercial and industrial use, and without the specter of blackouts, brownouts, or other interruptions in power due to intermittent failures of wind or sunlight.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One embodiment of the present invention includes the integration of a battery-type energy storage into the power converter of a Wind Turbine Generator. An energy storage device may be integrated into the DC bus of the power converter to provide power to a power grid. The energy storage device may implement various functions, including energy time shifting, load peaking, frequency response, and variable generation load firming. In addition to the battery energy storage device, the system of the present invention may be implemented by one of several designs that includes one or more of a voltage regulator (DC/DC converter) to manage the charge and discharge of the battery; a battery charger to charge the battery from the grid or using power generated locally by a wind turbine or a solar power array; and one or more solenoids to connect and disconnect the battery from the power converter and the battery charger.

Other embodiments of the invention include software modules that predict power output based on a number of the parameters. The predicted power output may be used by the system of the present invention to efficiently manage power output.

The following description and the annexed drawings set forth in detail certain illustrative aspects of the invention. These aspects are indicative, however, of but a few of the various ways in which the principles of the invention may be employed, and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

The accompanying drawings, which are incorporated in and constitute a part of this specification, show certain aspects of the present invention and, together with the description, help explain some of the principles associated with the invention.

DESCRIPTION OF ILLUSTRATIVE EMBODIMENTS OF THE INVENTION

Reference will now be made in detail to embodiments of the present invention, examples of which are illustrated in the accompanying drawings. The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Figure 1:
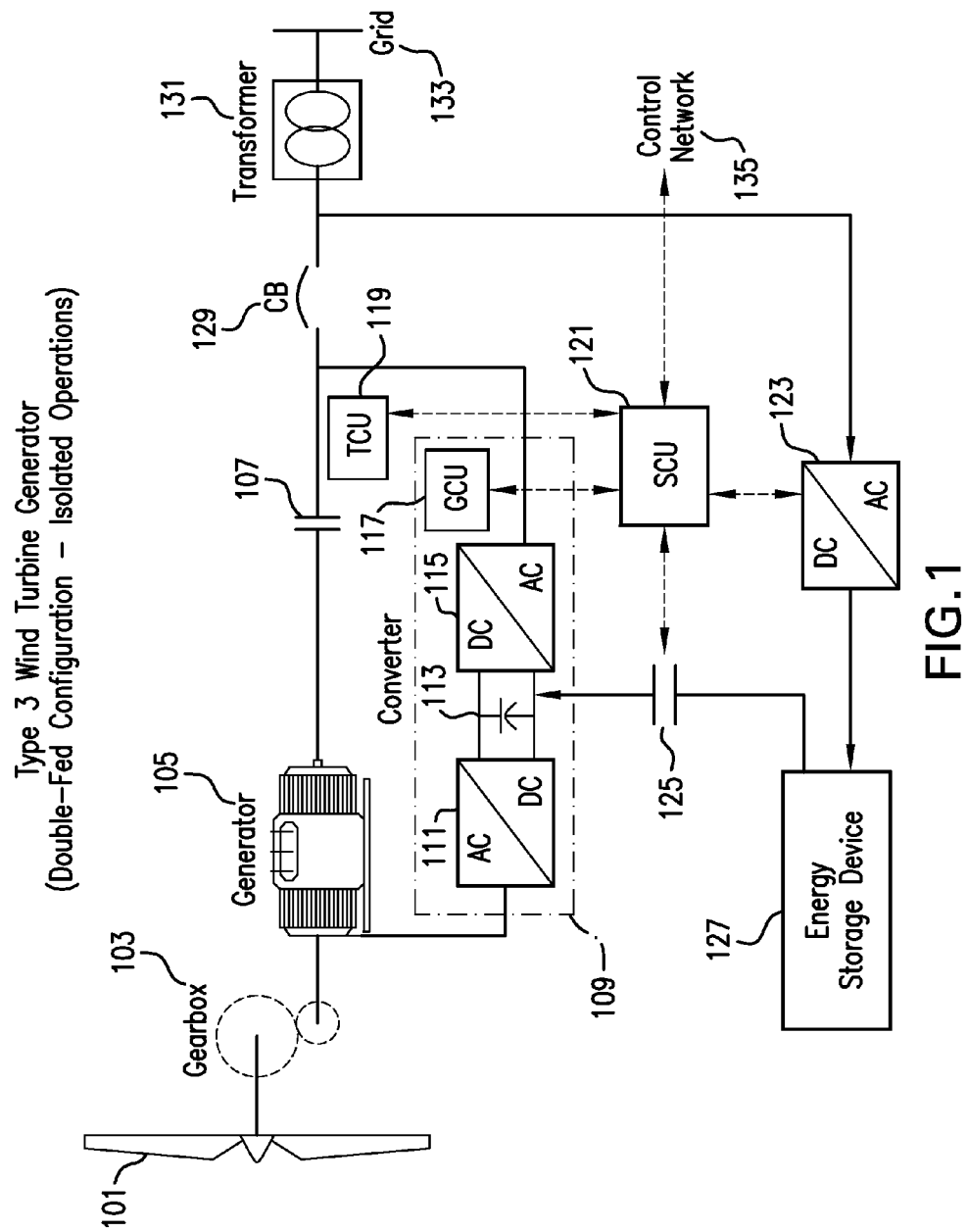
FIG. 1 illustrates a power generation system in accordance with a first illustrative embodiment of the present invention.

FIG. 1 illustrates a wind turbine power generation system in accordance with one embodiment of the present invention.

The system in FIG. 1 includes wind turbine 101, having a shaft coupled to generator 105 through the gearbox 103; a power converter 109; a turbine control unit (TCU) 119; a system command unit (SCU) 121 that may be used to receive commands or report performance data through a control network 135; a rectifier 123; an energy storage device (ESD) 127; a contractor or circuit breaker 107; a contractor or circuit breaker 129 that may be used to disconnect the turbine generator from the grid, for example, in the event of failure of first measures to decrease excessive power generated as a result of high-speed wind conditions; and a transformer 131 that connects the power generation system illustrated in FIG. 1 to the transmission grid 133. The converter 109 includes a rectifier/inverter 111; a capacitor 113; a rectifier/inverter 115; and a generator control unit (GCU) 117.

In one embodiment, the TCU 119 and the GCU 117 may be incorporated into the wind turbine. In that embodiment, access to those control units may be limited, as the units are isolated, and thus re-programming of the control units may prove difficult. The SCU 121 may be programmed with some of the functionality normally implemented by the TCU 119, for example, and it may be positioned out of the turbine for easy access by technicians desiring to program the unit.

In one mode of operation, under normal wind conditions rotor blades rotate a wind turbine shaft that is connected to the generator 105. In the illustrated embodiment the generator 105 produces two sources of power, one at a specific set frequency (e.g., 60 Hz) through a connection to the generator's stator, and another through a connection to the rotor at a frequency that varies depending on the rotation rate of the rotor blades. The stator power output is fed to a combiner unit (not shown) without first being conditioned by a converter. The power output from the rotor is conditioned by the converter 109 so that the frequency at the output of the inverter 115 is in synchronicity with the power signal from the stator before the two are combined, as the frequency of the AC power signal fed to the converter 109 varies according to the rotation rate of the blades.

This configuration whereby the two sources of power are combined before being fed to the grid is referred to herein as a double-fed configuration—isolated operations. The combined AC power is also fed into a rectifier 123 and the DC power output of the rectifier charges the energy storage device 127.

The TCU 119 monitors and controls the performance and operation of the turbine 101. For example, if the TCU 119 detects that the blades are rotating at a rate below an acceptable level, the TCU 119 may send an alert to the SCU 121. The SCU 121 may in turn inform other power generation systems through the network 135, for example. The SCU 121 may also send a command to the GCU 117 in the converter unit 109 to shut down. The SCU 121 may also be used to control the output of the energy storage device 127 to act as an auxiliary power source. For example, the ESD 127 may inject DC power into the converter 109 so that the generator can be operated by using stored energy and thus compensate for the low wind conditions. Conversely, if the TCU 119 detects excessive rotation rate of the blades the TCU 119 may command the turbine to shift the pitch of the blades to maintain a leveled power output from the generator.

With respect to the auxiliary power mode of operation, the SCU 121 would instruct the switch 125 to close so that power can be fed into the converter 109 from the ESD 127. The rectifier/inverter 111 may include one or more Insulated-Gate-Bipolar-Transistors, IGBTs, so that when power is fed by the ESD 127 into the converter 109, the IGBTs block the power flow back to the generator 105.

Figure 2:
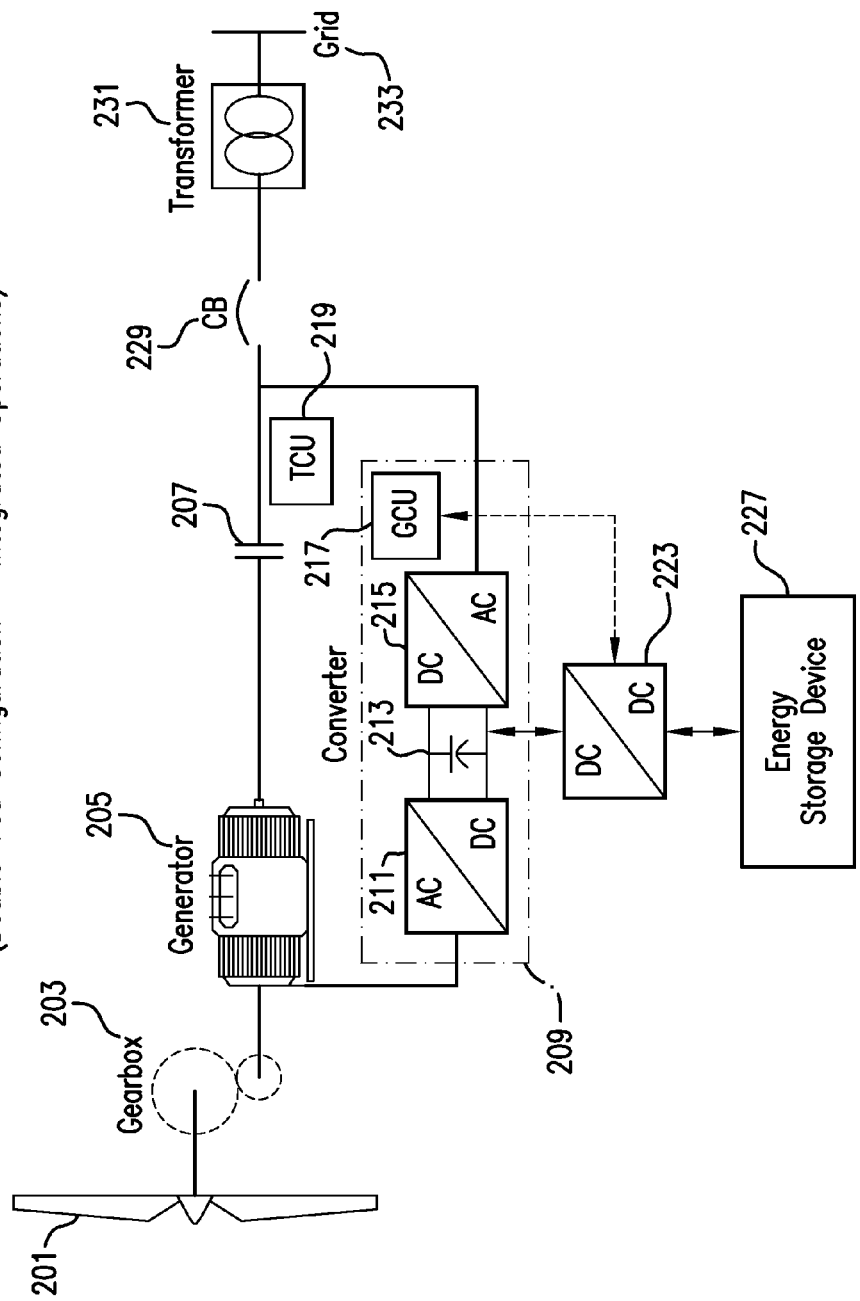
FIG. 2 illustrates a power generation system in accordance with a second illustrative embodiment of the present invention.

FIG. 2 illustrates an alternative embodiment to the double-fed power generation configuration. In the illustrated embodiment the functionality of the SCU 121 (in FIG. 1) may be implemented by the TCU 219 and/or the GCU 217. This configuration is referred to herein as a double-fed configuration—integrated operations. In the illustrated embodiment, the ESD 227 is charged under normal operation of the generator by power fed from the converter 209. The DC-DC converter 223 may be used to decouple the ESD 227 from the generation system so that it does not load the converter circuit, thus improving transient response to spikes produced by wind gusts, for example.

Figure 3:
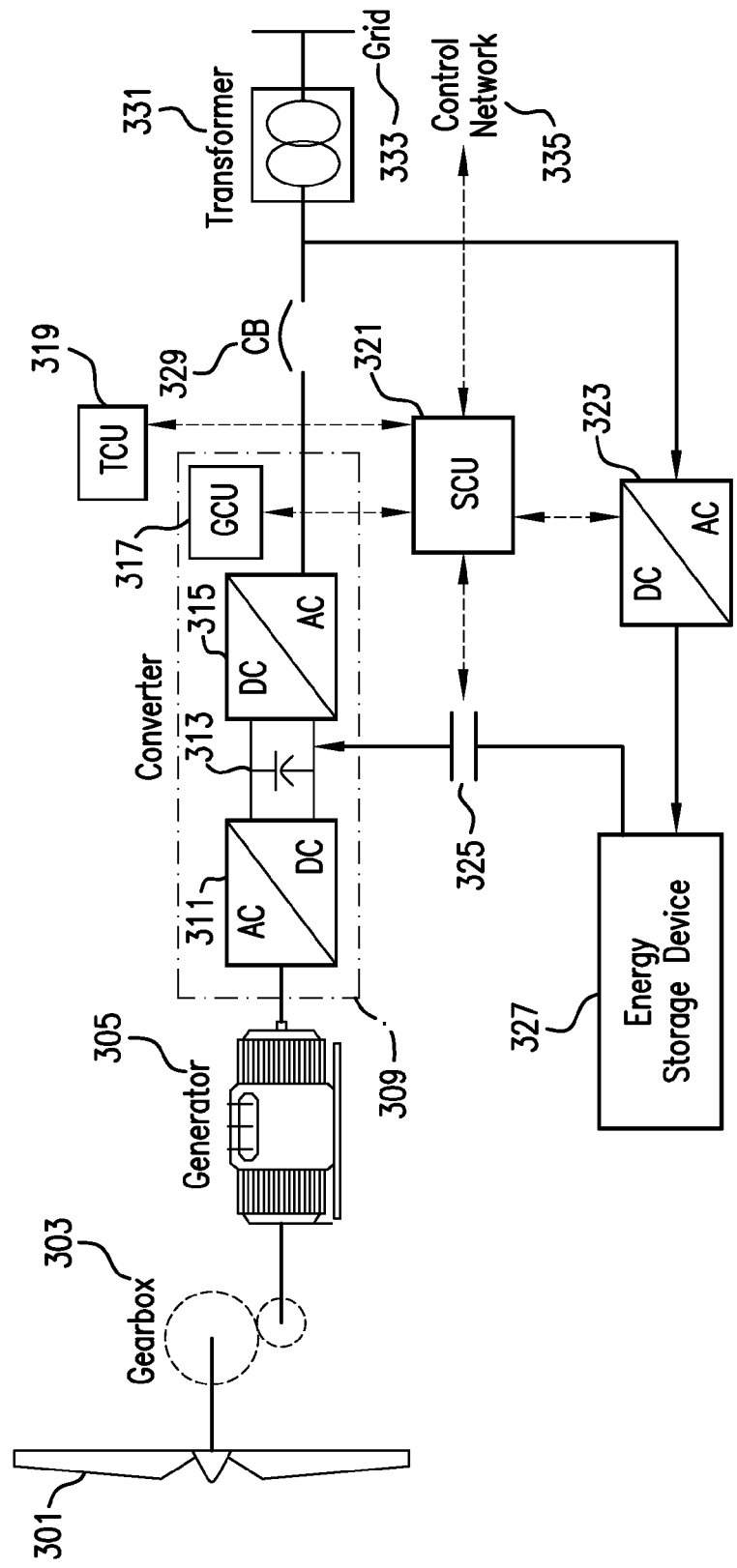
FIG. 3 illustrates a power generation system in accordance with a third illustrative embodiment of the present invention.

FIG. 3 illustrates an embodiment of the present invention where all the power generated by the wind turbine generator 305 is passed through the converter 309. The operation of the illustrated embodiment is similar to the operation of the embodiment of FIG. 1 with the notable difference that there is a single feed of power to the grid 333. This configuration is referred to herein as a fully-converted configuration—isolated operations.

Figure 4:
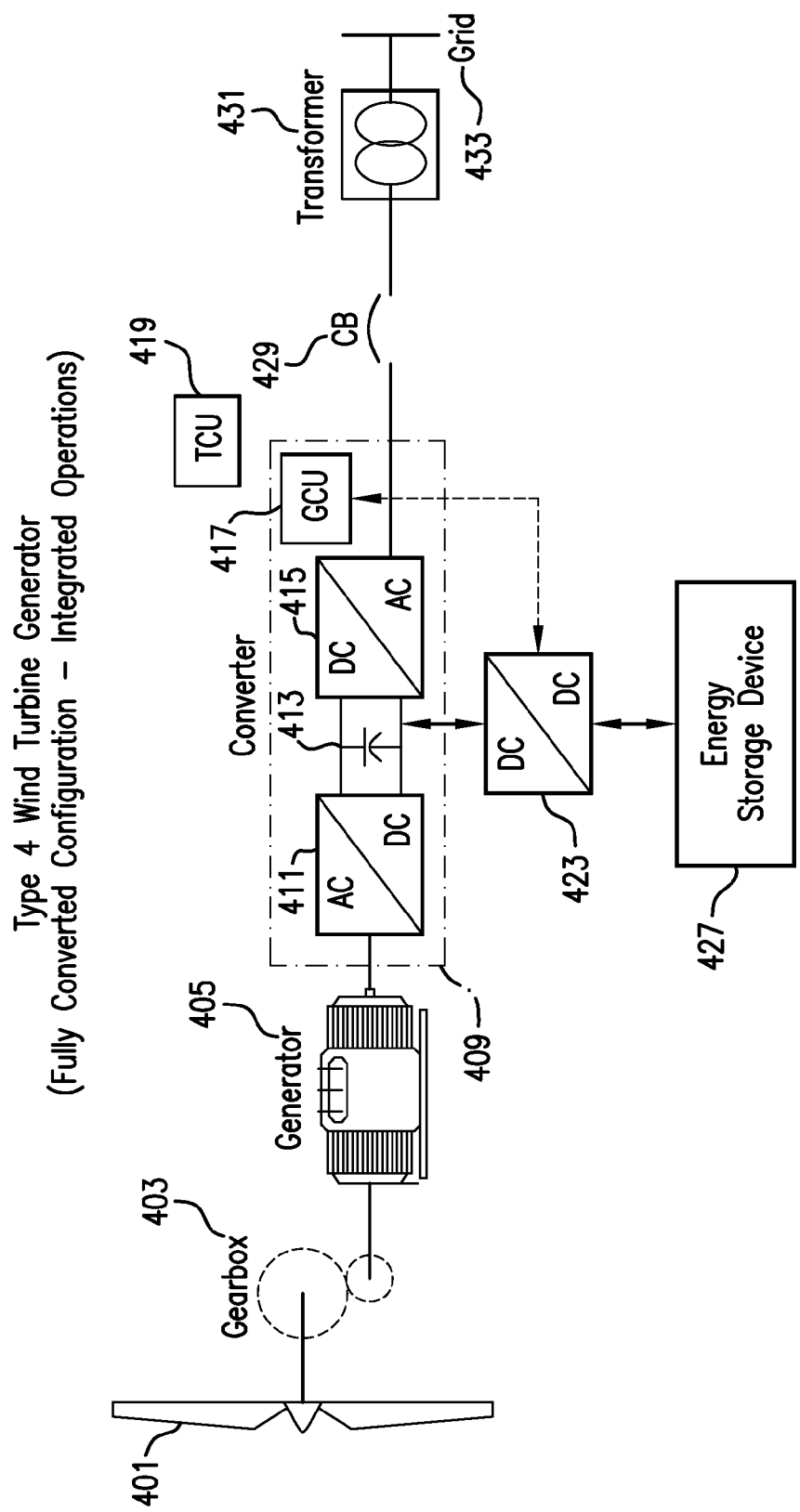
FIG. 4 illustrates a power generation system in accordance with a fourth illustrative embodiment of the present invention.

FIG. 4 illustrates an embodiment of the present invention where all the power generated by the wind turbine generator 405 is passed through the converter 409. The operation of the illustrated embodiment is similar to the operation of the embodiment of FIG. 2 with the notable difference that there is a single feed of power to the grid 433. In the embodiment illustrated in FIG. 4, the generator may be may be implemented as a synchronous generator. This configuration is referred to herein as a fully-converted configuration—integrated operations.

Figure 5:
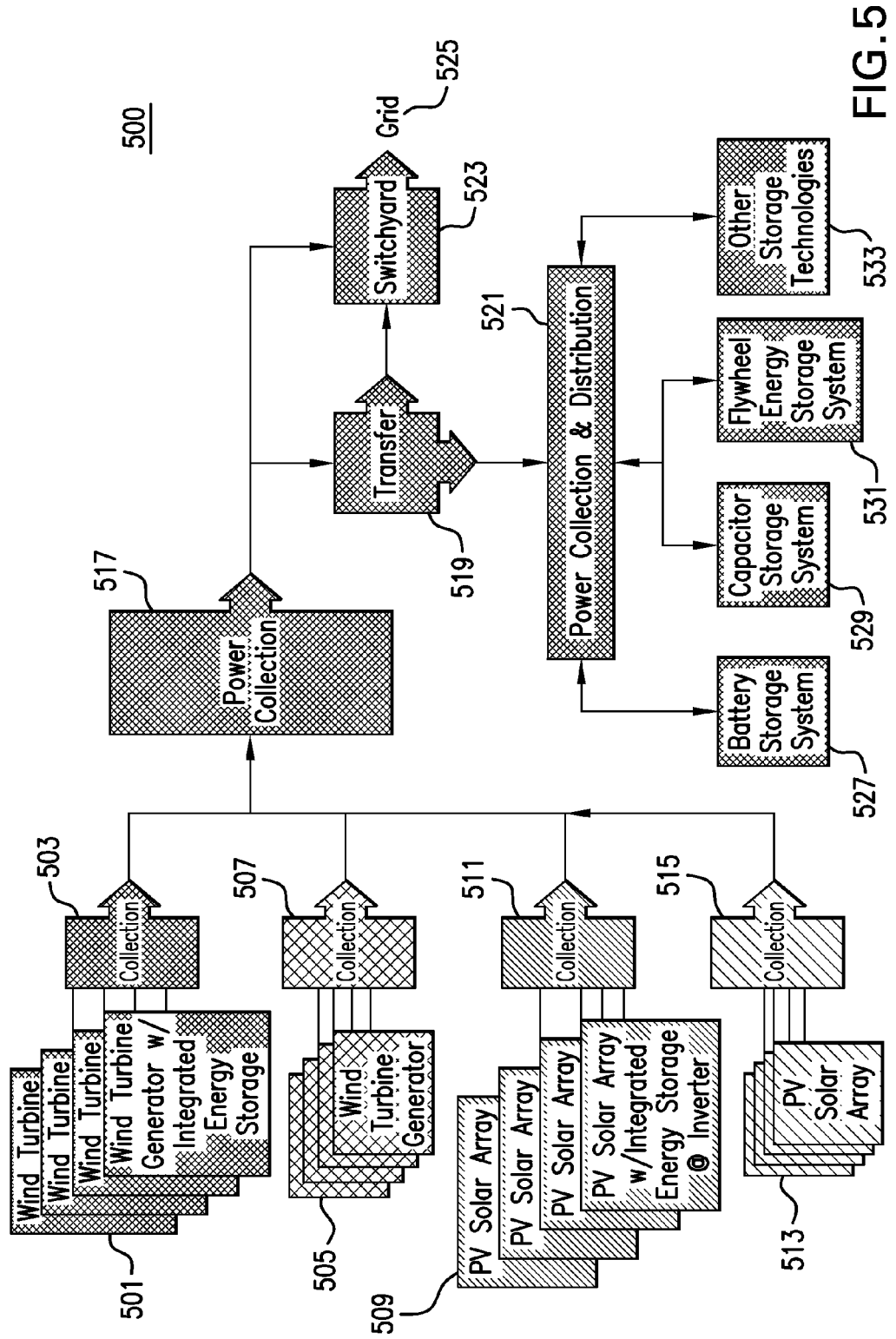
FIG. 5 illustrates a power generation system in accordance with a fifth illustrative embodiment of the present invention.

FIG. 5 illustrates a power collection system in accordance with one embodiment of the present invention. The system 500 may include one or more wind turbine generators 501 with integrated energy storage, such as the power generating system of FIGS. 1-4, for generating power signals to be combined at power collector 503. The system 500 may also include one or more conventional wind turbine generators 505 without the integrated energy storage feature of the present invention. The power generated by the one or more generators 505 may be combined by the power collector 507.

Figure 20:
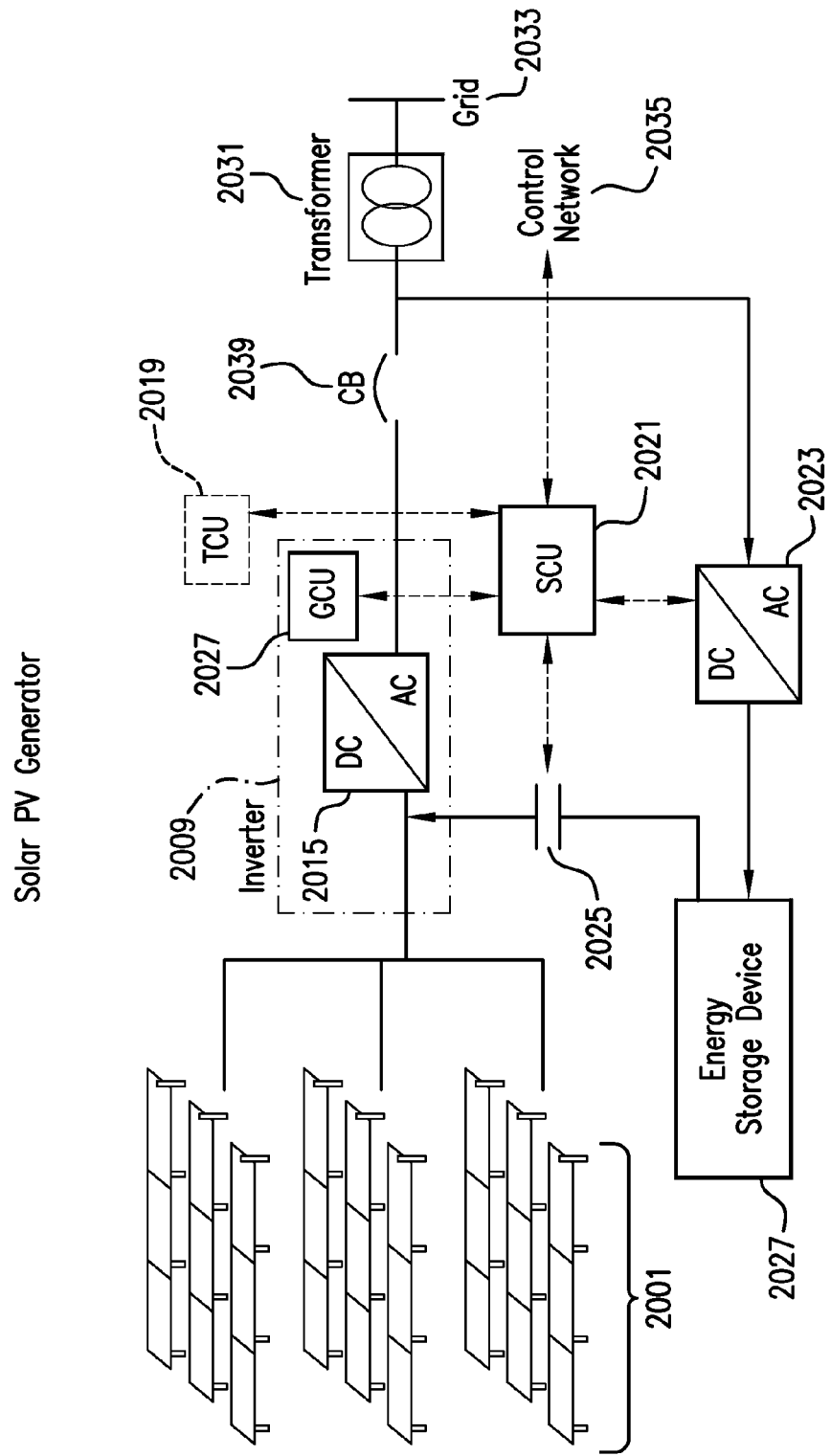
FIG. 20 illustrates a power generation system in accordance with another illustrative embodiment of the present invention.

The system 500 may also include one or more photovoltaic ("PV") Solar Arrays with the integrated energy storage feature of the present invention 509. The solar power arrays 509 may be implemented as fully converted-isolated or fully converted-integrated operations. Referring to FIG. 3, in a fully converted-isolated operation a solar array in 509 may replace elements 301, 305, 303, 319 and 311, so that the DC power generated by the solar array feeds into the inverter 315, with the operation of the ESD 327 as well as of the other remaining elements being similar. For example, when excessive solar power is generated, the power may either be stored locally at the PV solar array or it can be transmitted to a collection point for remote storage. Also when little solar power is available, the ESD 327 may be used to generate power to be fed to the grid. FIG. 20 illustrates the exemplary fully converted-isolated operation solar array panels.

In FIG. 20, the system includes a number of PV solar panels 2001 that generate DC power which is fed into inverter 2009; a tracking control unit (TCU) 2019; a system command unit (SCU) 2021 that may be used to receive commands or report performance data through a control network 2035; a rectifier 2023; an energy storage device (ESD) 2027; a contractor or circuit breaker 2039 that may be used to disconnect the PV power generator from the grid, for example, in the event of failure of first measures to decrease excessive power generated as a result of exposure to excessive sun light; and a transformer 2031 that connects the power generation system to the transmission grid 2033. The inverter 2009 includes a rectifier/inverter 2015; and a generator control unit (GCU) 2027.

In one embodiment, the TCU 2019 and the GCU 2027 may be incorporated in the location proximate to the PV panels. In that embodiment, access to those control units may be limited, as the units are isolated, and thus re-programming of the control units may prove difficult. The SCU 2021 may be programmed with some of the functionality normally implemented by the TCU 2019, for example, and it may be positioned in a location that allows easy access by technicians desiring to program the unit.

The TCU 2019 monitors and controls the performance and operation of the solar panels 2001. For example, if the TCU 2019 detects that the PV panels generate power below an acceptable level, the TCU 2019 may send an alert to the SCU 2021. The SCU 2021 may in turn inform other power generation systems through the network 2035, for example. The SCU 2021 may also send a command to the GCU 2027 in the inverter unit 2009 to shut down. The SCU 2021 may also be used to control the output of the energy storage device 2027 to act as an auxiliary power source. For example, the ESD 2027 may inject DC power into the inverter 2009 so that the generator can be operated by using stored energy and thus compensate for the low sunlight conditions. Conversely, if the TCU 2019 detects excessive generation of power by the PV solar panels, the TCU 2019 may control the operation of the PV solar panels to maintain a leveled power output.

With respect to the auxiliary power mode of operation, the SCU 2021 would instruct the switch 2025 to close so that power can be fed into the inverter 2009 from the ESD 2027. The rectifier/inverter 2015 may include one or more Insulated-Gate-Bipolar-Transistors, IGBTs, so that when power is fed by the ESD 2027 into the inverter 2009, the IGBTs block the power flow back to the PV solar panels 2001.

Referring to FIG. 4, in a fully converted-integrated operation, the solar array in 505 may replace elements 419, 401, 403, 405 and 411 so that the DC power generated by the solar array feeds into the inverter 415, with the operation of the ESD 427 as well as of the remaining elements being similar. The power signals generated by the one or more solar arrays 509 may be combined at the power collector 511. One or more conventional PV solar arrays 513 may also be used by the system 500, with the output power signals generated by the arrays 513 feeding into collector 515.

The combined power signals output by collectors 503, 507, 511, and 515 may then be further combined by power collector 517. In an alternative embodiment, if the generators and arrays 501, 505, 509, and 513 are close to each other, their output power may be combined by power collector 517 without requiring power collectors 503, 507, 511, or 515.

The power output by the collector 517 may be fed into both a transfer point 519 and a switchyard 523. The switchyard 523 provides the power to the grid 525.

The transfer point 519 feeds power for storage to one or more power storage systems through a power collections and distribution unit 521. The power storage systems may include a battery storage system 527, a capacitor storage system 529, a fly wheel energy storage system 531 or other storage technologies 533.

Upon customer demand, power may be provided to the grid by those energy storage systems through the transfer point 519 and switchyard 523. One advantage of the power system 500 is that it allows the use of renewable energy sources in a dispatchable system. A dispatchable system may be defined as a power system that supplies power to meet, without necessarily exceeding, demands by customers within a short period of time.

Figure 9:
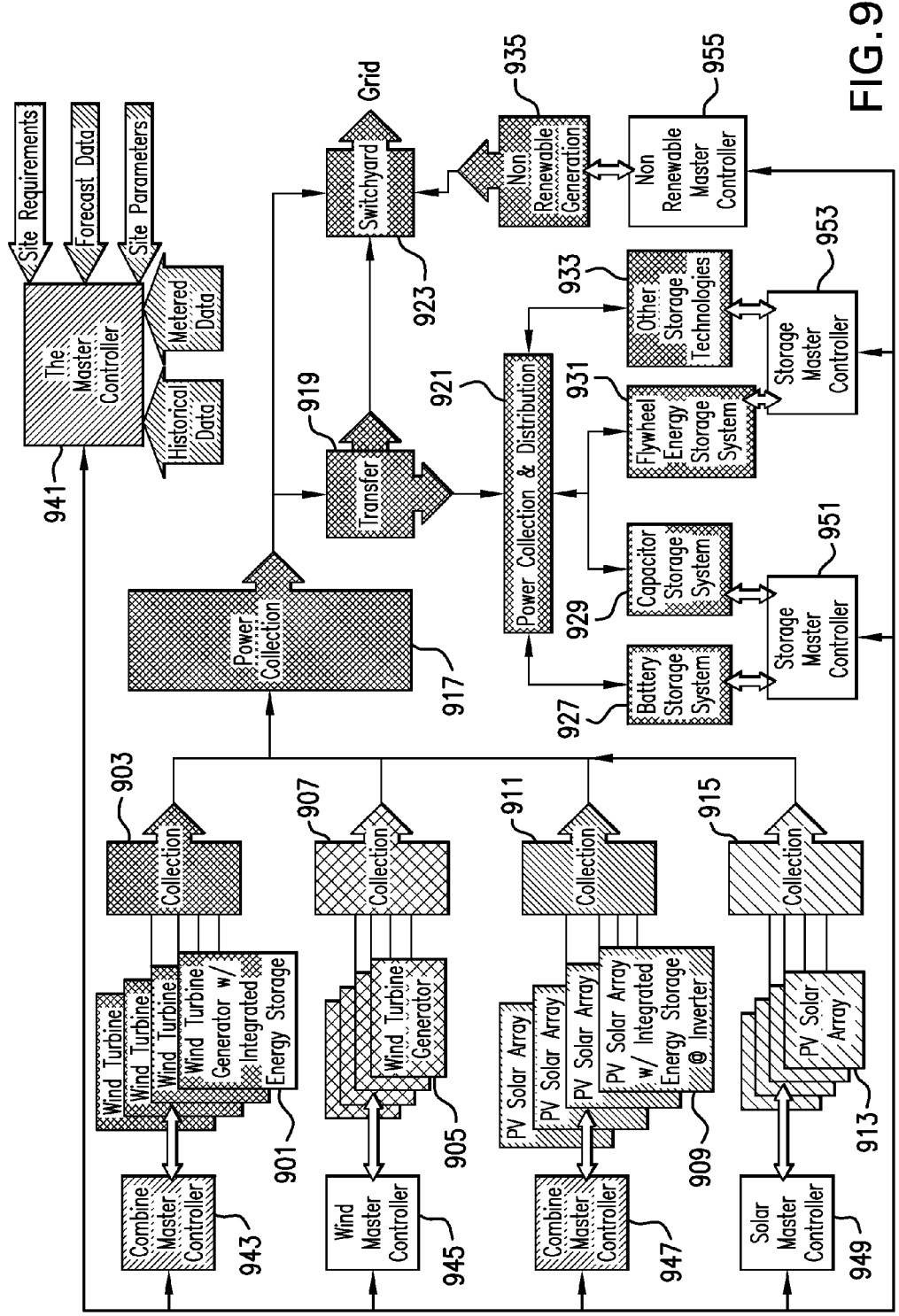
FIG. 9 illustrates a utility scale power generation facility in accordance with one embodiment of the present invention.

FIG. 9 illustrates a utility scale power generation facility in accordance with one embodiment of the present invention. The present invention includes integrating various forms of renewable generation devices, for example Wind Turbine Generator and Solar Photovoltaic (PV) panel arrays, which may optionally be equipped with integrated battery storage devices, into a utility scale generation facility which may be tied through a transmission level interconnect. Additionally, the utility scale generation facility may optionally contain an energy storage system consisting of one or more of a battery, capacitor, flywheel, or other energy storage system. The generation facility may have computer control systems that monitor and provide supervisory control to the various generation and storage devices. The computer control system may dynamically control the power generation output of the wind turbines, voltage regulation capabilities of the Solar PV inverters, and energy storage systems to provide new additional operating modes for the generation facility or site. The control system may monitor the following parameters: energy storage current state (e.g., state of charge of batteries), generating capability of each of the generating devices, generating output of each device, wind resource parameters (e.g., wind speed, air temperature, relative humidity, barometric pressure, etc.), solar resource parameter (solar irradiance, cloud cover, etc.), transmission power flows and constraints, and both current and past performance. These parameters, where applicable, may be used by the computer control system in conjunction with site configuration specific information (e.g., individual generator capabilities, geographical information, equipment design, ratings and configuration, contractual obligation restrictions, etc.) to model the optimal operations of the generating facility.

The control system may use conventional control logic combined with statistical modeling to maintain all aspects of the facility at its optimal performance. In one embodiment of the present invention, the optimal performance may be tied to configuring the site, for example, by taking into account all the specific capabilities and constraints of the site. To accomplish this, the control system may require not only actual operating parameters and contractual parameters, but may also require sufficient information to properly model the long term cost of operations. For example, the system may model the mechanical wear and tear of an operating wind turbine versus a shutdown wind turbine. Additionally, transmission constraints may be taken into account to prevent loss revenue opportunities due to transmission congestion curtailments.

In one embodiment of the present invention, the generation facility may be implemented as a dispatchable site, which allows a power off-taker, grid operator, or other operator to remotely control the total generation output of the site within predetermined operating limits and constraints. Additionally, the site may provide ancillary services such as frequency response (provided by the integrated energy storage systems) as well as potentially other ancillary services for which the system operator or off-taker would be willing to pay.

The optimization may use the following criteria to provide a recommended operating condition for each device:

Wind Turbine Generators
  Basic wind resources parameters, such as wind speed, wind direction, air temperature, and relative humidity to calculate the expected power output capability of the individual wind turbine.
  Geospatial wind turbine arrangement and geographical elements (e.g., mountains, valleys, etc.) to determine the probable wind "shadowing" of one turbine or element on another wind turbine, as wind shadowing varies in response to wind direction.
  Predicted or forecasted weather conditions that would preclude a wind turbine from generating power. This includes low wind speed, high wind speed, and possible wind blade icing conditions, lightning, and others. A person of ordinary skill in the art would recognize that there are presently commercially available products that may be used to forecast wind from companies such as WindLogics (www.windlogics.com).
  Operating state (running, available, maintenance mode, etc.) of the wind turbine as to determine its ability to be operated or controlled.
  Predicted (or otherwise estimated or modeled) life or remaining useful life calculations of the various mechanical components.
  Any manually or automatically entered special operating restriction of the device.

Solar PV Panel Arrays
  Basic solar resources parameters, such time of day, day of year, calculated sun position, solar irradiance.
  Predicted and/or forecasted weather conditions that impact power output. Including predicted impact from cloud cover. A person of ordinary skill in the art would recognize that there are presently commercially available products that may be used to forecast solar power from companies such as Clean Power Research, L.C.C. (www.cleanpower.com).
  Inverter capability and current operating levels and conditions.

Integrated Battery Storage (optionally integrated to the wind turbines and/or solar inverters).
  State of charge of batteries
  Capacity (both design and predicted) of battery
  Battery Voltage
  Ambient Temperature FIG. 9 illustrates a system similar to the collection system of FIG. 5, with like numerals indicating like modules or elements. The system of FIG. 9 also includes a Master Controller 941 that collects data (for example, "system inputs" in FIG. 10) including performance measurements, historical calculations, predicted data, etc. from a number of different sources such as remote wind power generation sites, wind or solar prediction software modules, or constant design parameters (for example, "source" in, FIG. 10). The input data is processed by the controller 941 to produce a number of output control signals that feed into combine master controllers 943 and 947, wind master controller 945, solar master controller 949, storage master controllers 951 and 953, and the non-renewable master controller 955. The site illustrated in FIG. 9 includes a non-renewable power generator for 935 use in the event that demand cannot be met by stored power or power produced by the renewable energy sources 901, 905, 909, or 913.

Figure 10:
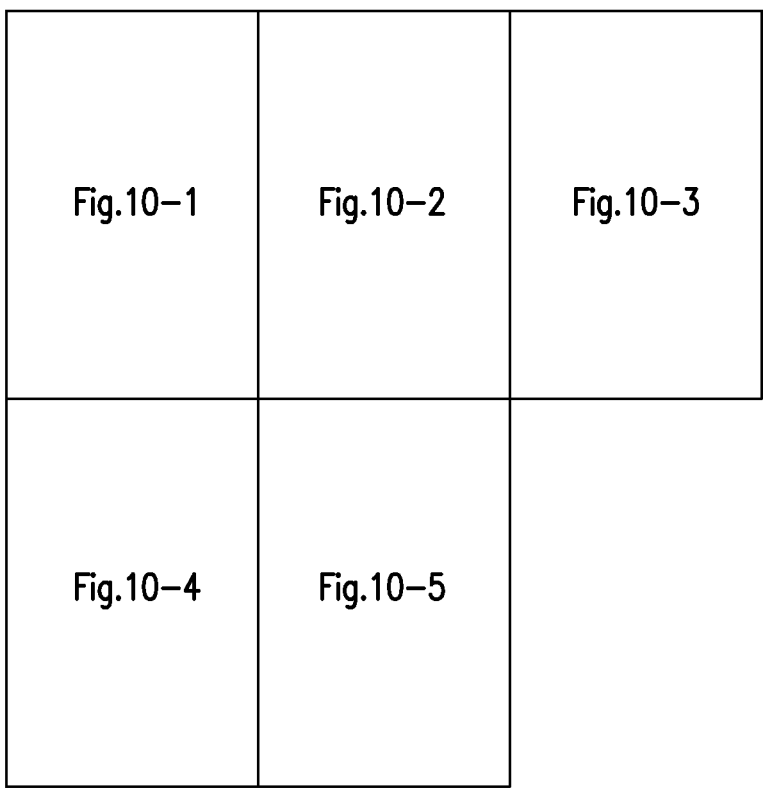
FIG. 10 illustrates a chart illustrating parameters input into a control system and the mapping of the parameters to a system output in accordance with one embodiment of the present invention.
Figure 11:
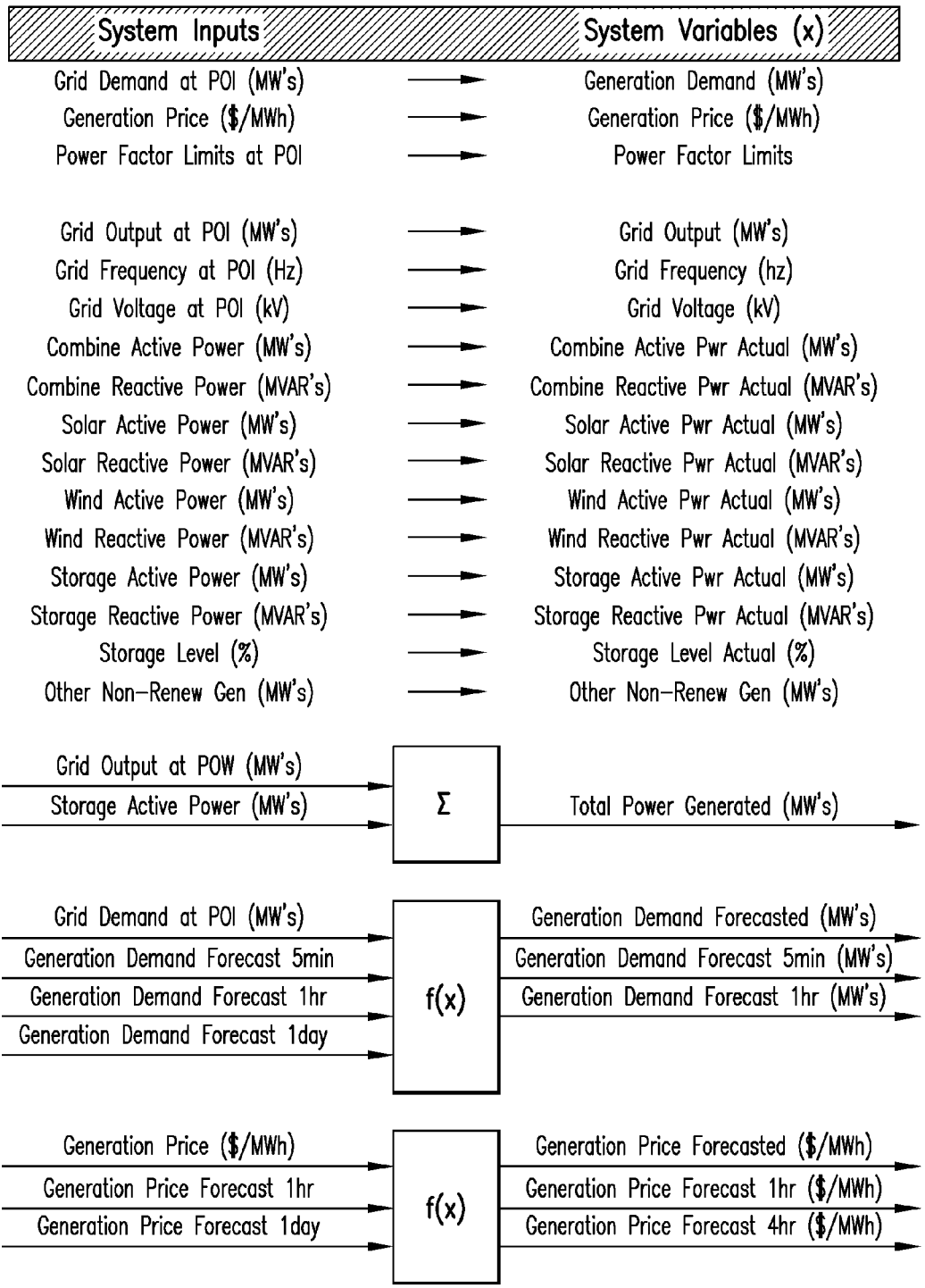
FIG. 11 illustrates input-output functions illustrating the processing of a subset of variables and parameters illustrated in FIG. 10 in accordance with one embodiment of the present invention.
Figures 1, 11:
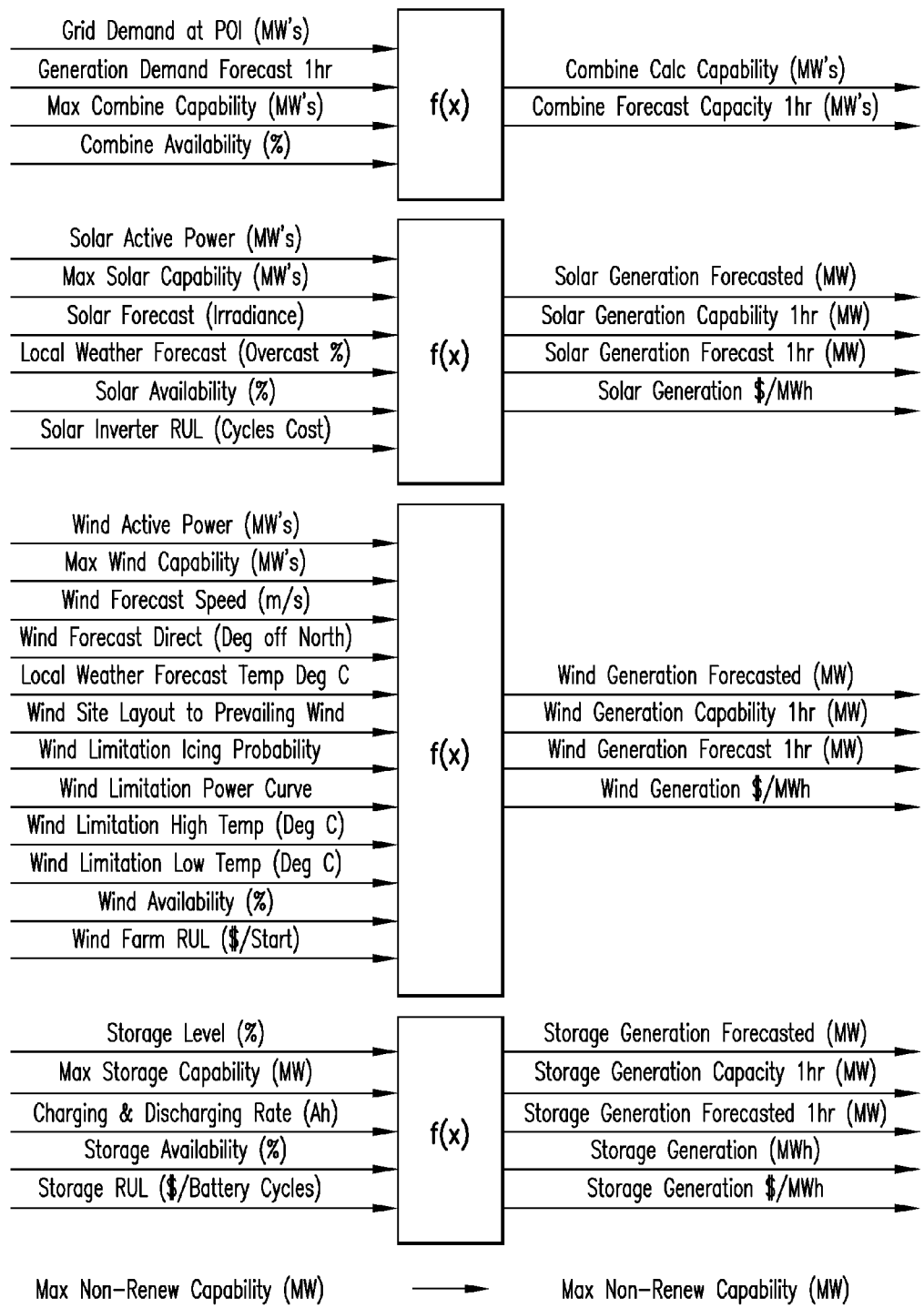
Figure 12:
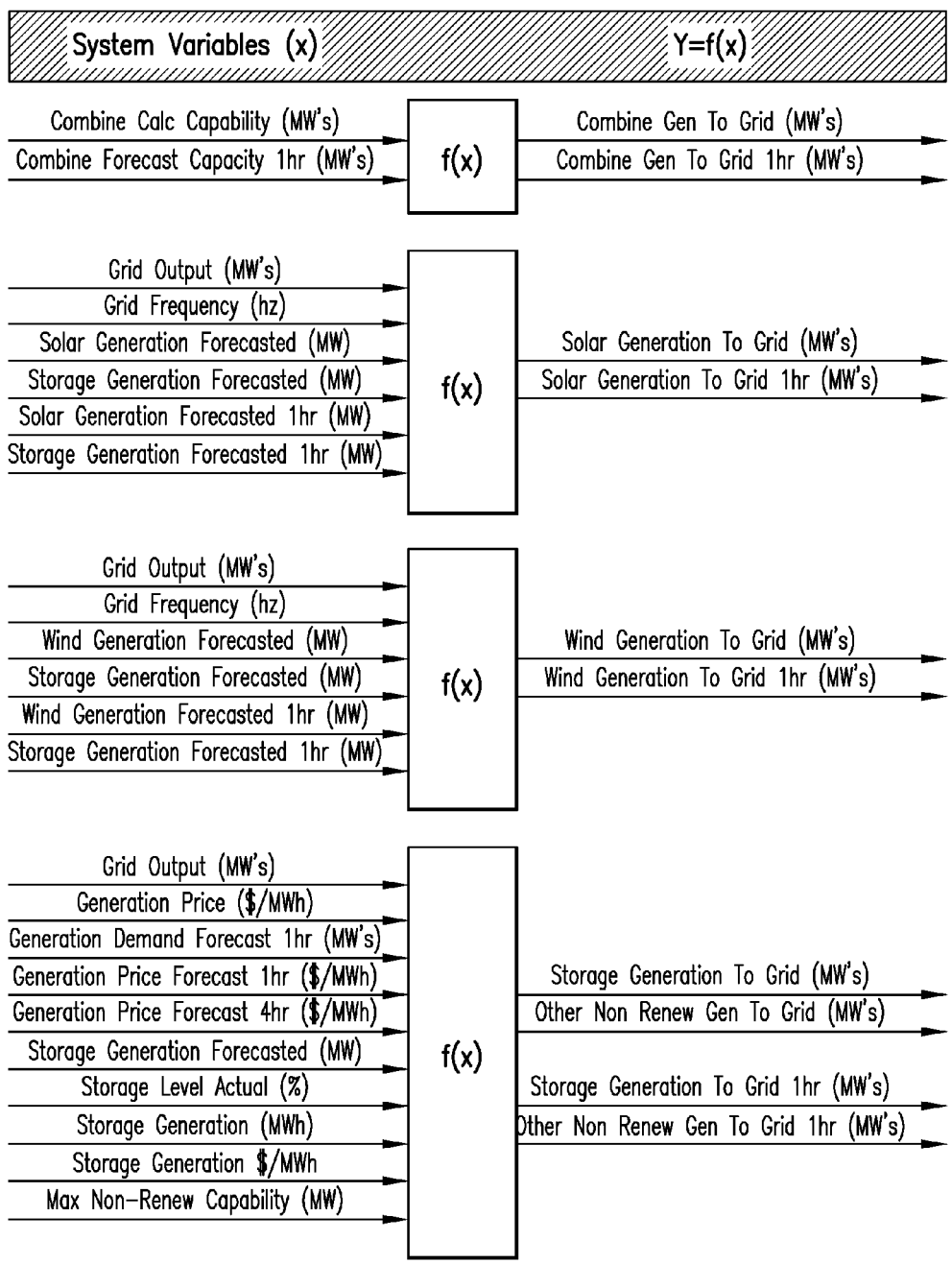
FIGS. 12-15 illustrate input-output functions illustrating the processing of a subset of variables and parameters illustrated in FIG. 10 in accordance with one embodiment of the present invention.
Figure 13:
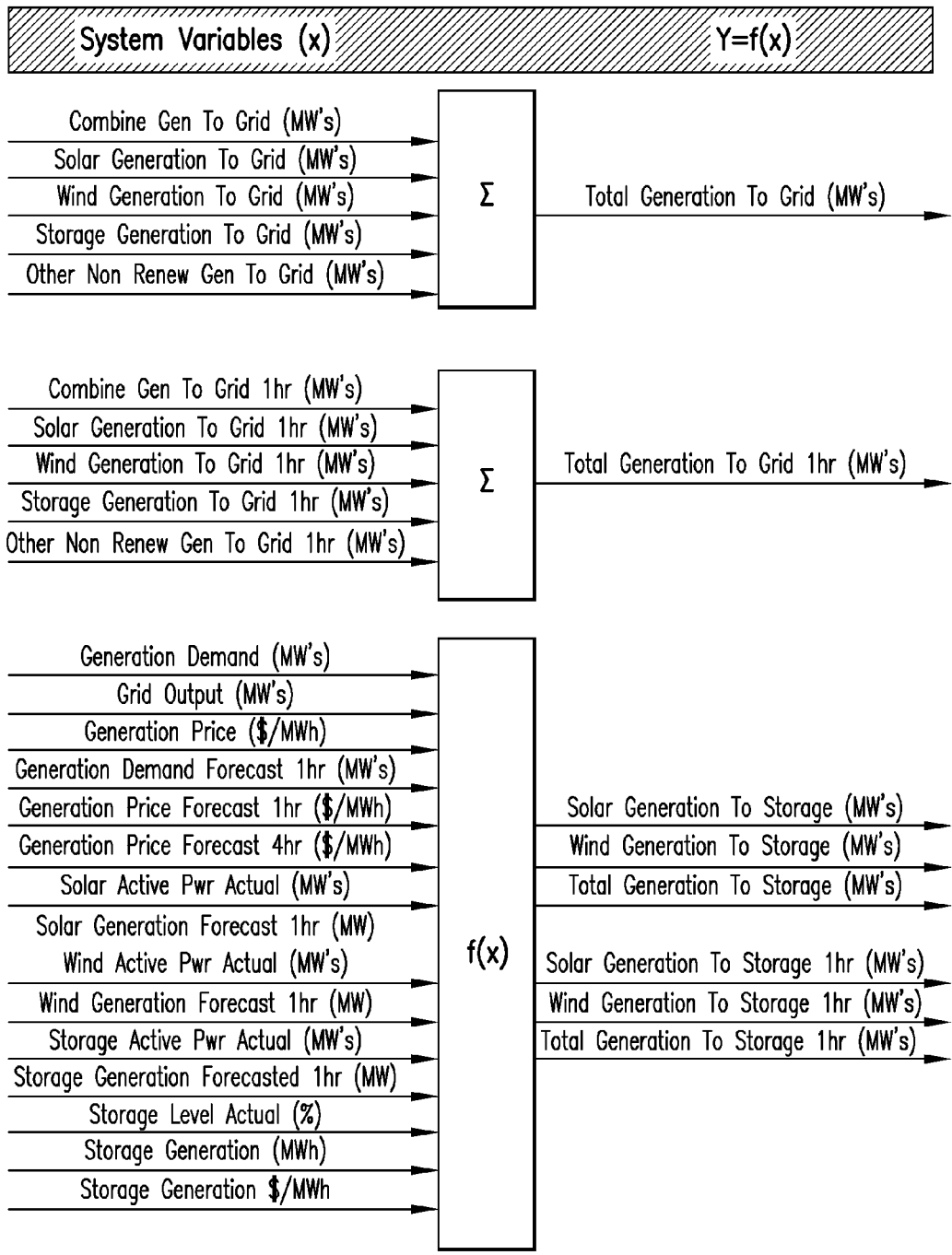
Figure 14:
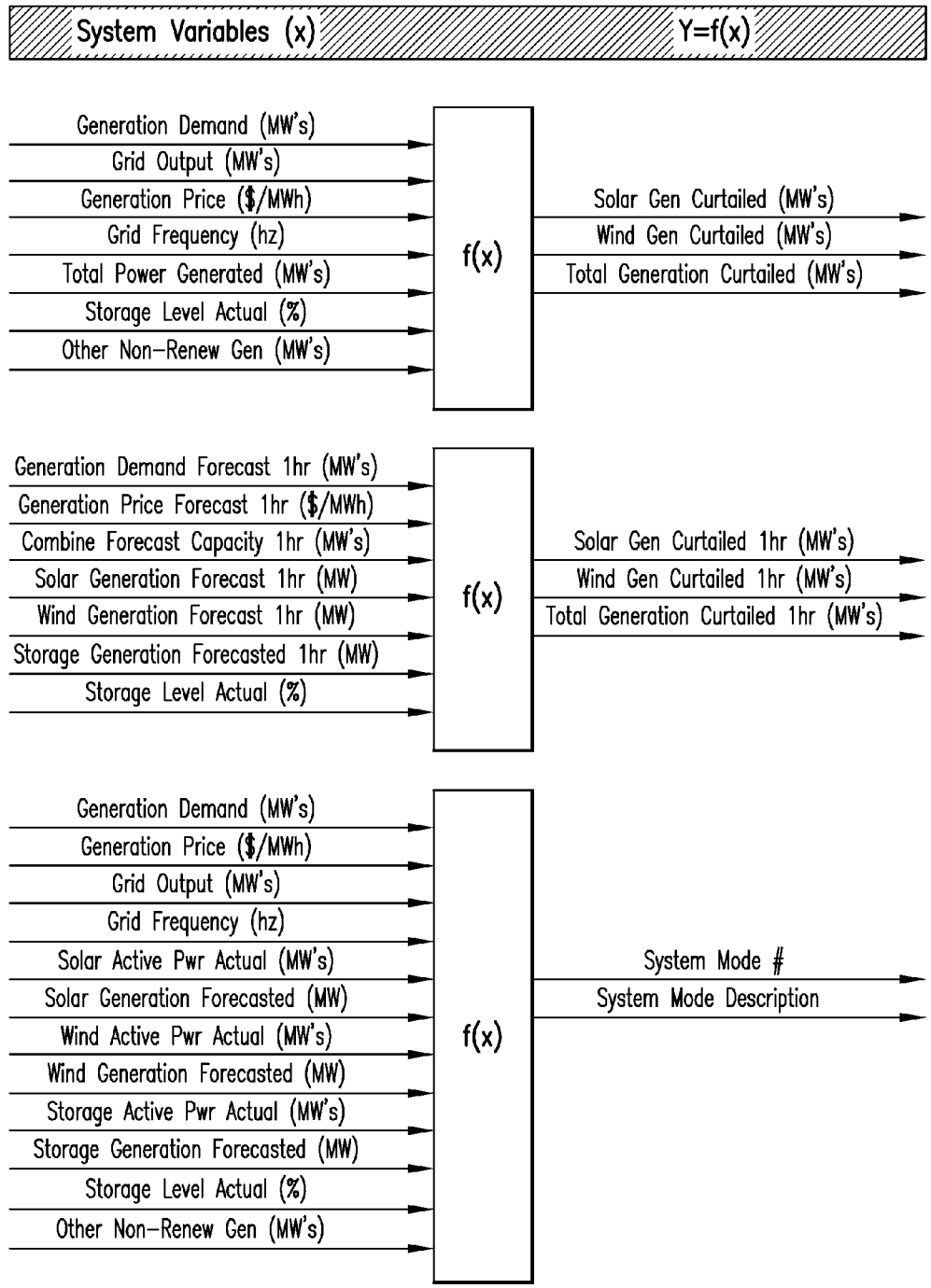
Figure 15:
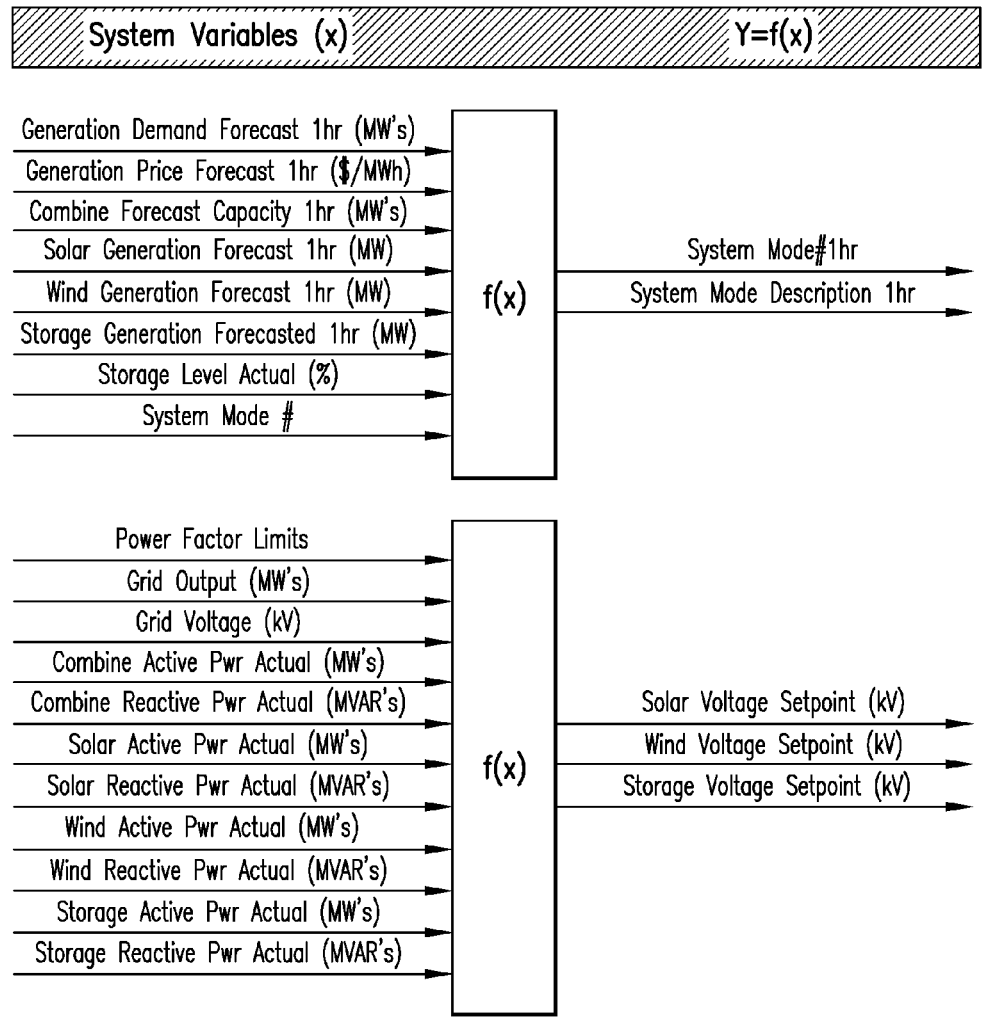
Figure 16:
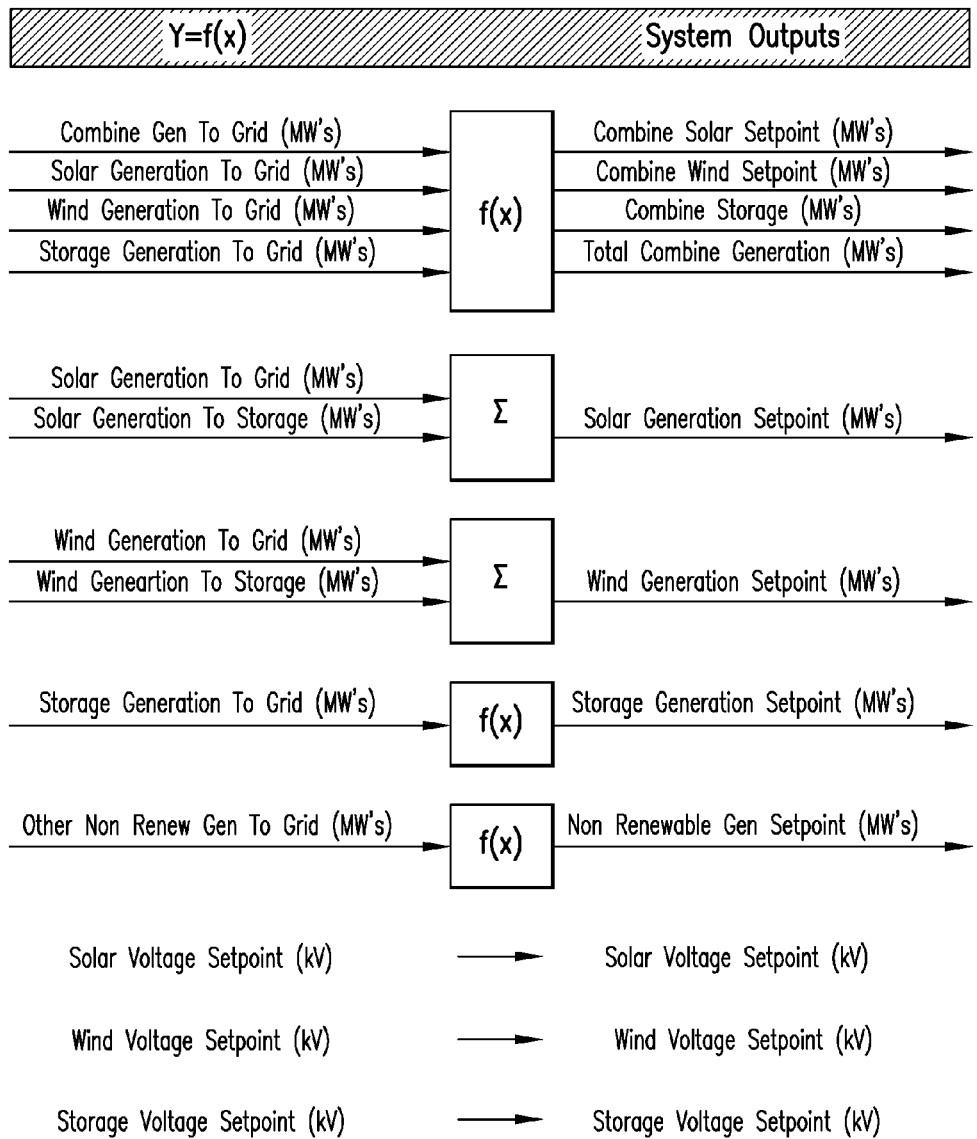
FIG. 16 illustrates input-output functions illustrating the processing of a subset of variables and parameters illustrated in FIG. 10 in accordance with one embodiment of the present invention.

FIG. 10 illustrates signals or parameters used by the controller 941 to produce control signals that are output to combine master controllers 943 and 947, wind master controller 945, solar master controller 949, storage master controllers 951 and 953, and the non-renewable master controller 955. These parameters are well known in the art, for example, "Grid Demand at POI" may be defined as the active power requirements of the grid to support the load; "Combine Active Power" may be defined as power (MW's) produced by a combination of power sources (PV and battery or wind and battery); "Combine Reactive Power" may be defined as reactive power (Mvar's) produced by a combination of power sources (PV and battery or wind and battery); "Combine Availability" may be defined as availability (%) of a combination of power sources (PV and battery or wind and battery); "Solar Inverter RUL" may be defined as solar inverter remaining useful life; "Combine Calc Capability" may be defined as calculated capability (MW's) of a combined embodiment, (PV and battery or wind and battery) based on wind or solar conditions and system efficiency; "Combine Gen To Grid" may be defined as addition of MW's from all embodiments metered at the Point of Interconnect (POI); "Solar Generation Setpoint" may be defined as required active power setpoint form solar embodiments required to meet grid demand at POI; etc. The first column indicates a potential source of the signal or parameter while the second column indicates the specific parameter being fed to the controller 941. These input signals or parameters are processed at a first stage to produce a number of system variables (third column in FIG. 10) with the relationship of system variables to system inputs being illustrated in FIG. 11. The resulting signals or parameters are processed at a second stage to produce the additional intermediary signals (fourth column in FIG. 10) with the relationship of intermediary signals (Y=f(x)) to system variables being illustrated in FIGS. 12-15. The intermediary signals are processed at a final stage to produce the output control signals (system outputs, fifth column in FIG. 10) with the relationship between system output signals and the intermediary signals being illustrated in FIG. 16.

Figure 6:
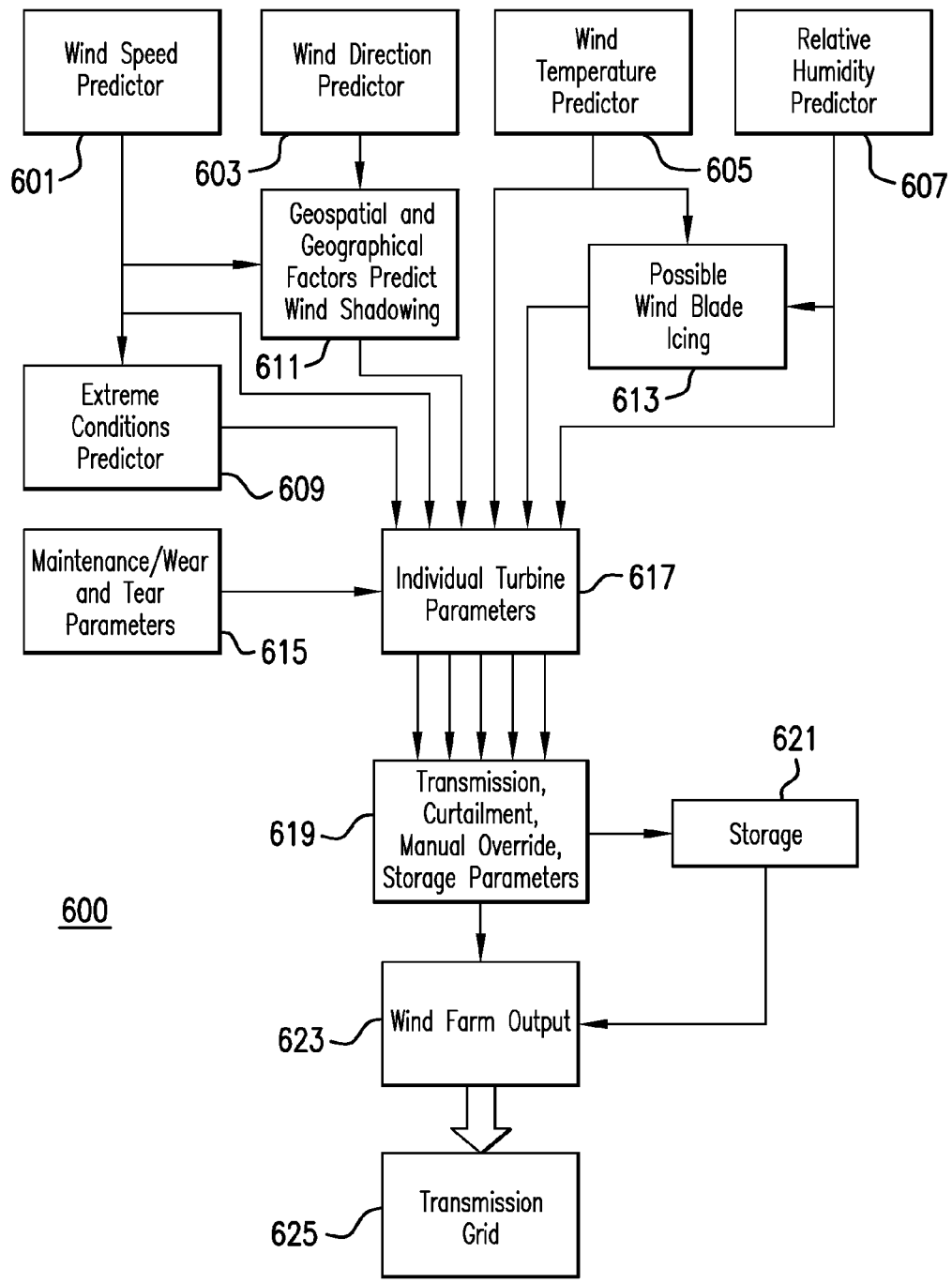
FIG. 6 illustrates a power generation system in accordance with a sixth illustrative embodiment of the present invention.

FIG. 6 illustrates a wind turbine power generation system 600 in accordance with one embodiment of the present invention. The system 600 includes a number of sensors (not illustrated) that output signals to be used by a number of modules that predict wind and environment conditions related to a wind farm location. For example, the system 600 may include a wind speed predictor module 601, a wind direction predictor module 603, a temperature predictor module 605 and a relative humidity predictor module 607. Wind prediction data may be fed to an extreme conditions predictor 609. For example, the extreme conditions predictor module may process wind prediction data to predict hurricane-like conditions. In the illustrated embodiment, that prediction data is fed to module 617, which may process the prediction data with measured maintenance/wear and tear parameters (provided by module 615) and with other individual turbine parameters measured locally at each turbine to cause the system 600 to shut down the wind turbine, for example, or command other remedial measure though actuator module 619, for example.

The wind speed prediction data and the wind direction prediction data may be input into a wind shadowing prediction module 611. In a wind farm, a number of wind turbines and their corresponding wind blades may be aligned in a row, for example, in a manner such that wind direction and speed impact the performance of some of the aligned turbines. Thus, under certain wind conditions, it may be appropriate to either pitch the blades in a given direction or even shut one or more turbines down to maximize or optimize the power output from the wind farm 623 to the transmission grid 625.

In the illustrated embodiment, that wind shadowing data is fed to module 617, which may process the prediction data with measured maintenance/wear and tear parameters (provided by module 615) together with other individual turbine parameters measured locally at each turbine to cause the system 600 to command either a shift in blade position or the shutting off of wind turbines in advance to optimize the power output by the wind farm 623.

In a similar fashion, a wind temperature predictor module 605 and a relative humidity predictor module 607 may feed wind temperature prediction data and relative humidity prediction data to module 617 so that the system 600 can anticipate temperature and humidity conditions that require preventive actions or measures. In an alternative configuration, the wind temperature prediction data and relative humidity prediction data may be fed to a wind icing prediction module 613 to ascertain the probability that ice will form on wind blades. The icing prediction data may also be fed into the module 617 to enable the system 600 to command shutting off turbines corresponding to wind blades that are expected to experience icing conditions, for example. FIG. 6 also illustrates module 621 to indicate the incorporation of the energy storage systems illustrated in FIGS. 1-4, for example.

Figure 8:
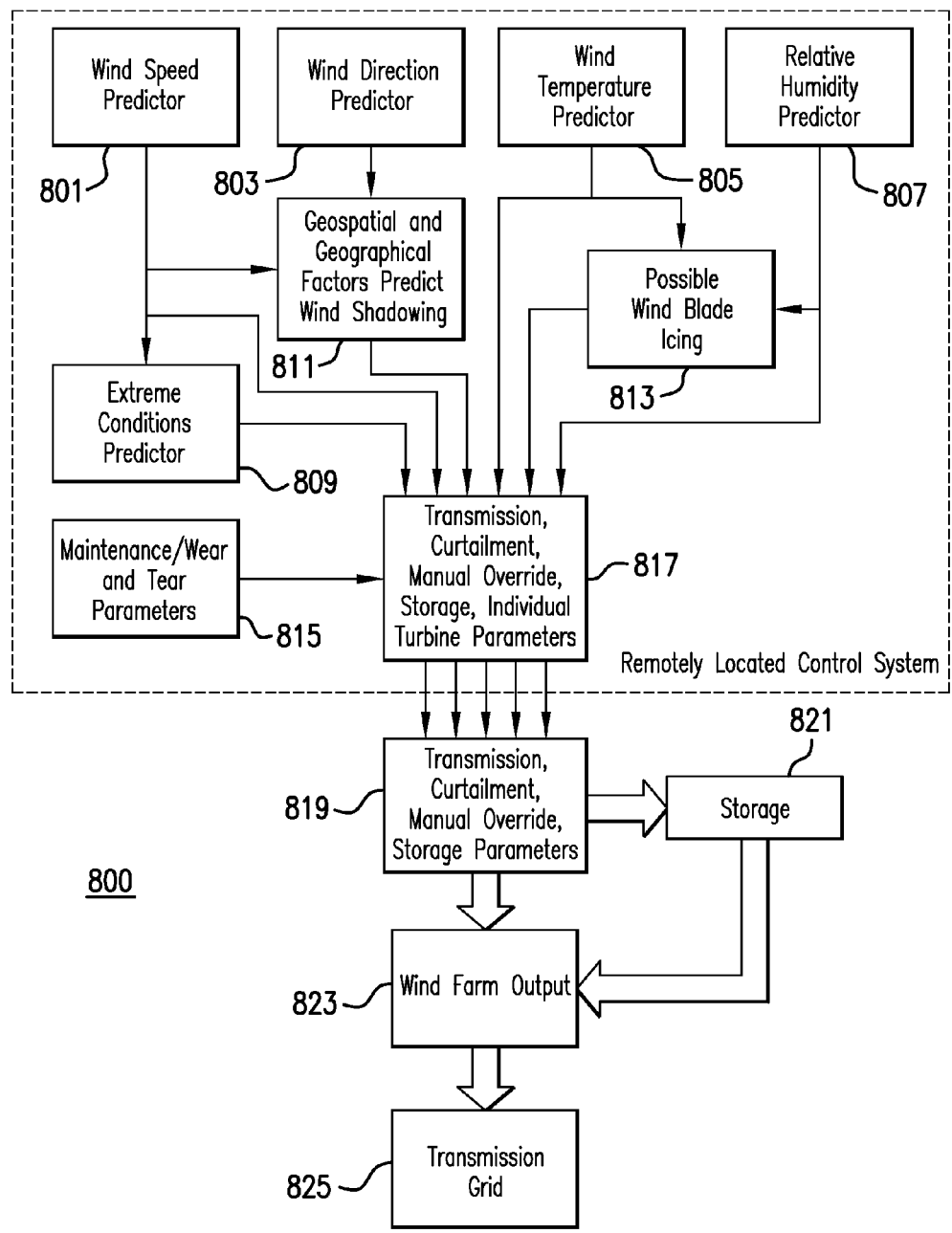
FIG. 8 illustrates a power generation system in accordance with an eight illustrative embodiment of the present invention.

FIG. 8 illustrates system 800 which is an alternative embodiment to the system 600 of FIG. 6, with like numerals indicating like modules or elements (numerals 801 to 825 correspond to elements 601 to 625). In system 800 the control system is remotely located.

Figure 7:
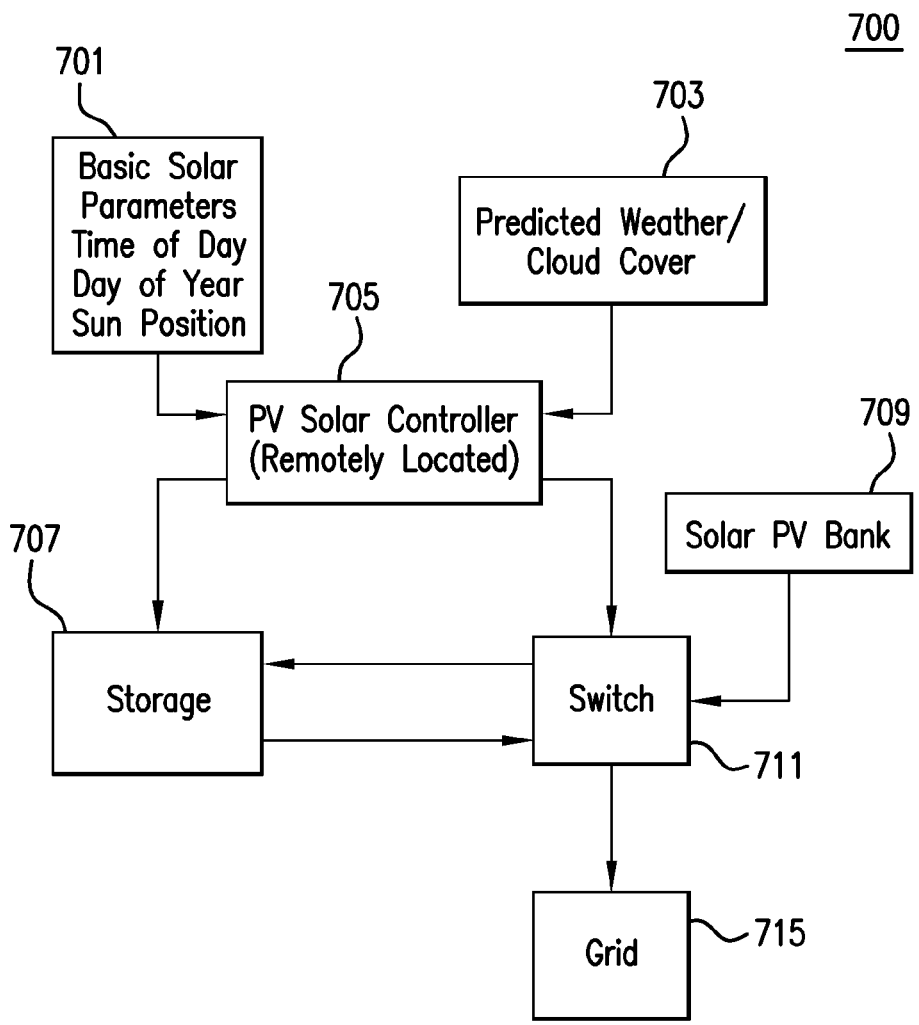
FIG. 7 illustrates a power generation system in accordance with a seventh illustrative embodiment of the present invention.

FIG. 7 illustrates one embodiment of the generation system of present invention that factors in prediction of solar power generation parameters. Specifically, the illustrated embodiment includes a weather and cloud predictor module 703 which feeds prediction data into a remote PV Solar controller 705. The controller 705 may apply the prediction data together with basic solar parameters (e.g., time of day, day of the year, position of the sun, etc.) measured by module 701. The controller 705 controls a switch 711 to manage the power output by the solar PV bank 709. For example, when cloud conditions are anticipated, the power from the storage system 707 is fed to the grid 715. When power is to be supplied by the storage unit 707 to the grid 715, power is routed through the switch 711.

Figure 17:
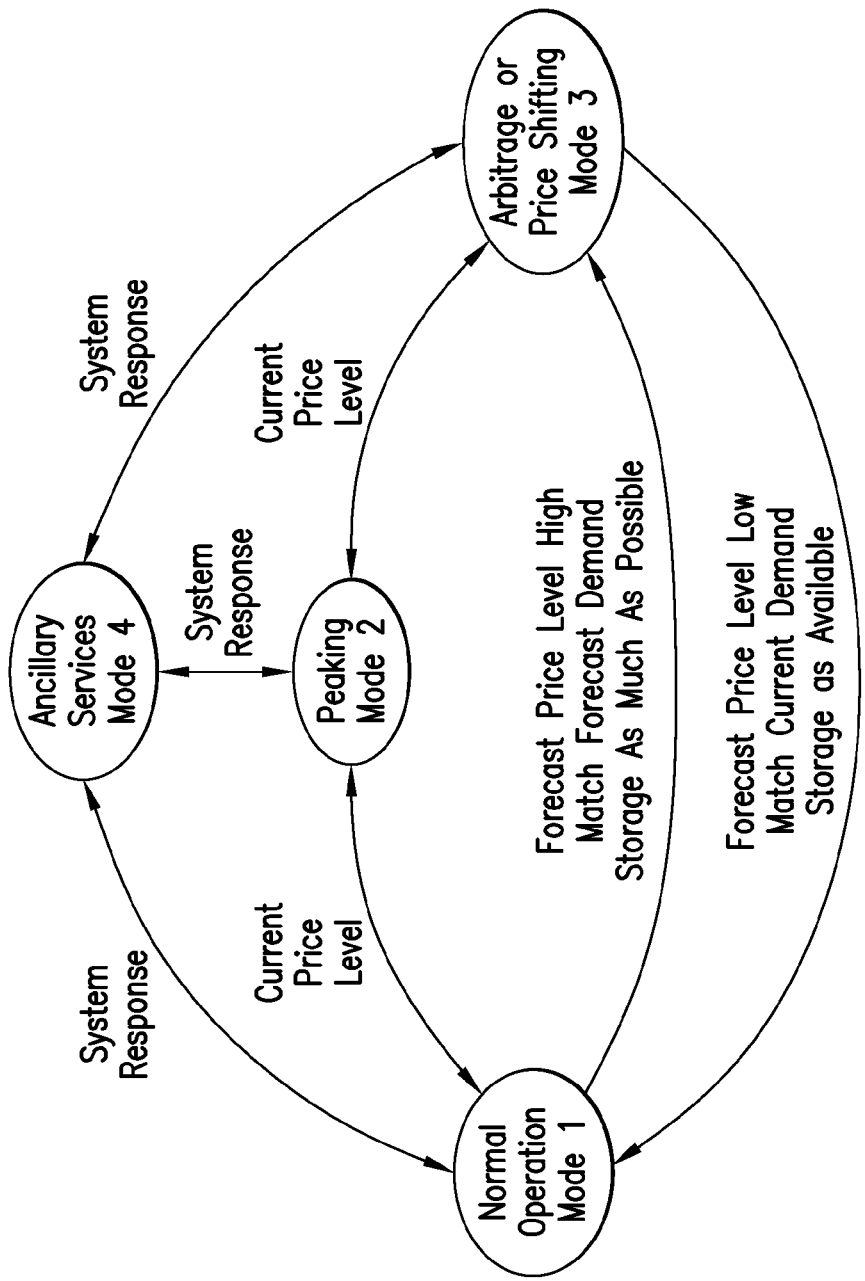
FIG. 17 illustrates a high-level state diagram describing the operation of a master controller in accordance with one embodiment of the present invention.

FIG. 17 illustrates a high level state diagram of the modes of operation of the site illustrated in FIG. 9, for example. The controller 941 may operate the site in ancillary services mode in response to a request generated by a client, for example. Operation in peaking mode may be triggered by the state of the power pricing. For example, if the price being paid for the power is high, the site may operate at peak level to capitalize on the market fluctuation. Pricing issues may also trigger operation in normal (or demand following mode) or in arbitrage (or price following mode). When a forecast power price level matches forecast demand, the arbitrage mode is triggered. Products that forecast price levels are currently available. For example, Cambridge Energy Solutions sells the Dayzer market analysis tool that can forecast day-ahead hourly prices. When a forecast price level matches current demand, the normal mode is triggered.

More specifically, the controller 941 may operate the site in one of multiple operating modes. These modes include the following:

Normal Operation—An operating mode where the site is responding to externally generated (from System Operator) MW output demand signals. In this mode, the system balances actual MW demand requirements with other factors such as pricing, equipment life expenditure, and other forecasted operations.

Peaking Mode—An operating mode where the site will produce the maximum power available including operating above rated capacity and potentially at operating parameters outside the normal design specifications. This mode may be used for situations such as system emergencies or during highly profitable situations. In this mode, the goal is to meet the MW demand within the reasonable capabilities of the equipment.

Arbitrage and Price Shifting—An operating mode where the site utilizes its storage reserves to shift the time between when power is generated and when the power is delivered to the grid. This shifting can be a result of either contractual commitments or as a result of an attempt to maximize profits from shifting power delivery in response to forecasted price signals. In this mode, maximizing revenue is the priority.

Ancillary Services—Special operating modes that deliver power based on special system operations needs. An example of this includes providing frequency response capabilities. Preferably, all other operating modes should consider any ancillary services obligations.

Figure 18:
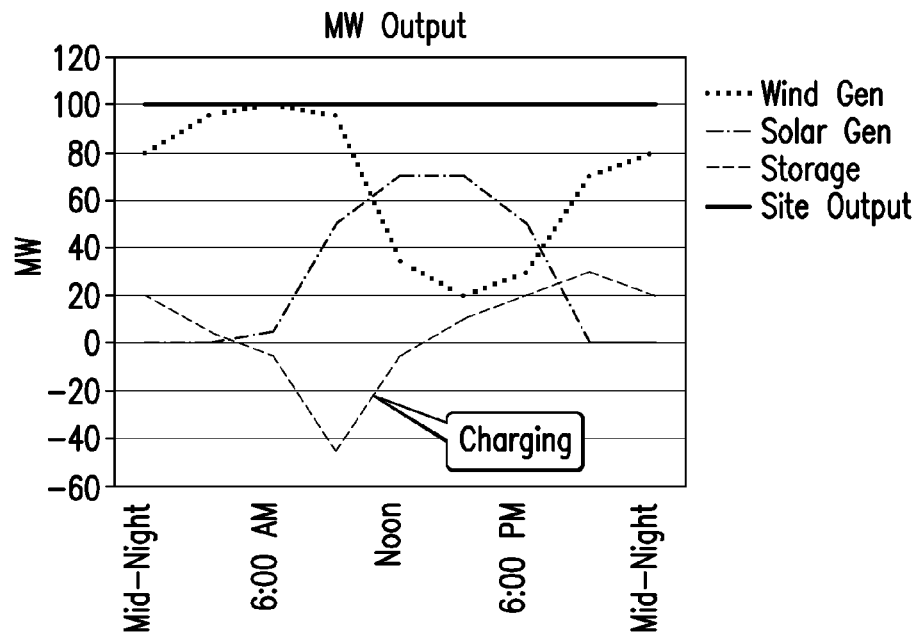
FIG. 18 illustrates a graph depicting an operating scenario where a site's output is requested to be at constant power.
Figure 19:
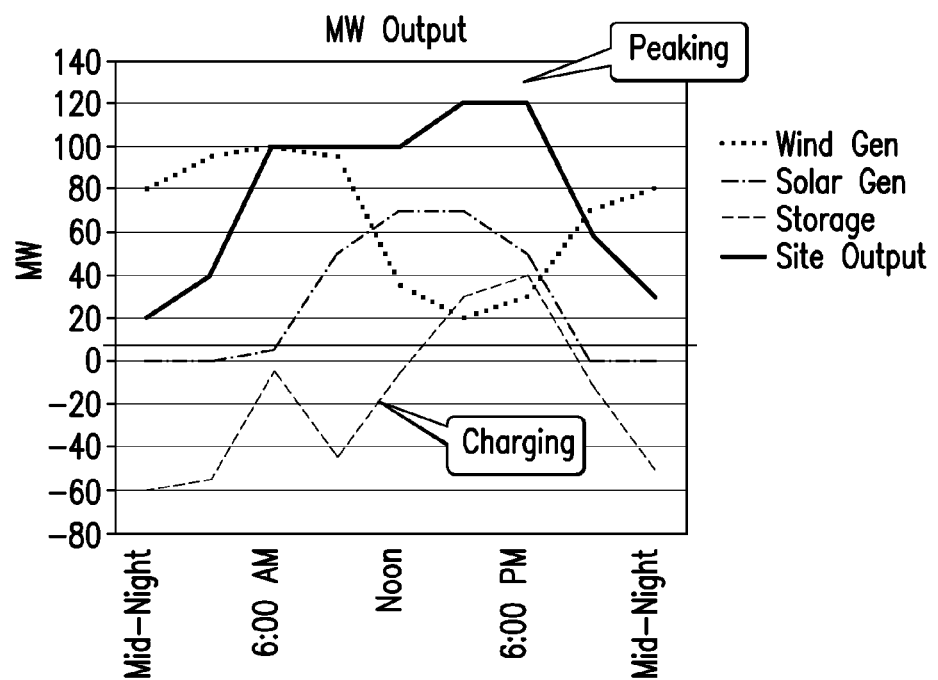
FIG. 19 illustrates a graph depicting an operating scenario where a site's output has a variable demand request.

During normal operations of the site, the overall controller will balance the use of available solar generation, available wind generation, and storage capacity to meet the dispatched output request from the system operator. The controller takes into account limits and other constraints to ensure the site equipment is used within its desired operational and design limits. For example, Graph 1 in FIG. 18, shows an example of a typical operating scenario where the site output is requested to be flat (100 MW in the example). In this scenario, the desired site output is 100 MW during the entire day. In this example, the available wind generation varies throughout the day with more power being produced during the morning and evening hours. The solar generation also varies throughout the day with the majority of the power being delivered near noon. In this scenario, the storage system would be used to make up the insufficient generation during the morning and evening hours and would be used to absorb (charge) the power during the mid day hours. In another typical scenario depicted in Graph #2, in FIG. 19, the sites output follows a demand request starts lower in the morning, increases to its rated capacity (e.g., 100 MW) as the morning progresses, that followed by a peaking request in the early afternoon, followed by a decrease in the evening hours.

In this scenario, the energy storage system is used to absorb the extra generation that is available during the morning and evening hours. It is also used to meet the peaking demands during the early afternoon.

In both of the scenarios described above, it is assumed that the capacity of the storage system is able to provide/absorb power as shown on the graphs. However, the controller may monitor the storage system(s), both collectively and individually, to ensure that the state of charge of the storage is within predefined limits. In one embodiment, the storage system will have limits that are more restrictive than the actual design capability of the system. This helps ensure that the storage system can respond to sudden unexpected demands on it. For example, a frequency response event.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in many other ways, using equivalents and alternatives that do not depart from the scope of the following claims. Moreover, unless indicated to the contrary in the preceding description, none of the components described in the implementations are essential to the invention.

We claim:

1. A dispatchable energy generation system comprising:
   at least one renewable energy source with integrated energy storage;
   at least one point of interconnect for collecting power generated by said at least one renewable energy source;
   a power transfer device for supplying collected power to a grid and for supplying power to charge at least one energy storage device, wherein said at least one energy storage device can dispatch power to the grid upon request;
   at least one non-renewable energy source for dispatching power to the grid upon request; and
   a master controller for controlling the operation of the at least one renewable energy source, the at least one non-renewable energy source, or the at least one energy storage device, by sending at least one output control signal based on a plurality of parameters,
   wherein the at least one renewable energy source includes a wind farm site, the wind farm site including a wind speed predictor module, a wind direction predictor module, a temperature predictor module, a relative humidity predictor module, and a control module,
   wherein said control module receives data from at least one of a said wind speed predictor module, said wind direction predictor module, said temperature predictor module, or said relative humidity predictor module, and processes said data to command a remedial measure though an actuator module.

2. The system of claim 1, wherein the at least one renewable energy source includes one of a photovoltaic solar array or wind turbine generator.

3. The system of claim 1, wherein the wind farm site further comprises:
   an extreme conditions predictor module;
   a wind shadowing predictor module; and
   a module storing measured or estimated turbine wear and tear condition information; and
   wherein data from said wind speed predictor module is input to said extreme conditions predictor module;
   wherein data from said wind speed predictor module and said wind direction module is input to said wind shadowing predictor module; and
   wherein said control module may receive additional data from said extreme conditions predictor module, said wind shadowing predictor module, or said module storing measured turbine wear and tear condition information, and said control module processes said data to command the remedial measure though the actuator module.

4. The system of claim 3, wherein the extreme conditions predictor module processes wind prediction data to predict hurricane-like conditions.

5. The system of claim 3, wherein the control module further processes individual turbine parameters measured locally at a turbine in said wind farm.

6. The system of claim 3, wherein said remedial measure includes at least one of shutting down a turbine in said wind farm, pitch blades in a direction, or send a command to curtail power to optimize power output produced by the wind farm.

7. The system of claim 3, further comprising at least one energy storage device.

8. The system of claim 3, further comprising a wind blade icing predictor module; wherein data from said temperature predictor module and said relative humidity module is input to said wind blade icing predictor module; and said control module processes icing prediction data from said wind blade icing predictor module.

9. The system of claim 1, wherein the at least one renewable energy source includes a solar photovoltaic bank comprising:
   a weather predictor module;
   a historical solar parameters database module;

an energy storage module for storing energy produced by said bank;

and a controller module that receives data from said weather predictor module and said database module to control dispatchment of power generated by said solar photovoltaic bank or said energy storage module.

10. The system of claim 1, wherein said parameters comprise at least one of:

historical data corresponding to operation of at least one of said at least one energy storage device, said at least one renewable energy source, or said at least one non-renewable energy source;

metered data corresponding to operation of at least one of said at least one energy storage device, said at least one renewable energy source, or said at least one non-renewable energy source;

site parameters corresponding to at least one site corresponding to said at least one renewable energy source;

forecast information corresponding to at least one site corresponding to said at least one renewable energy source; or site requirements corresponding to at least one site corresponding to said at least one renewable energy source.

11. The system of claim 10, wherein the master controller includes means for processing said parameters to produce said control signal.

12. The system of claim 1, wherein said energy storage device includes at least one of a battery storage device, capacitor storage device, or flywheel energy storage device.

13. The system of claim 1, further comprising renewable energy sources without integrated storage.

* * * * *